US006316081B1

(12) United States Patent
Nelson et al.

(10) Patent No.: US 6,316,081 B1
(45) Date of Patent: Nov. 13, 2001

(54) PHOTOGRAPHIC JACKET AND ALBUM

(75) Inventors: David J. Nelson, Rochester; Robert C. Bryant, Honeoye Falls; Bryan D. Bernardi, Rochester; Thomas M. Stephany, Churchville, all of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/335,404

(22) Filed: Jun. 17, 1999

(51) Int. Cl.[7] .............................. B32B 27/14; B32B 3/00

(52) U.S. Cl. .............................. 428/195; 281/22; 281/31; 281/38; 281/40

(58) Field of Search .................................... 428/195, 220, 428/332; 281/22, 31, 51, 38, 40; 402/79; 40/124.6, 405, 124.2; 283/36–42, 56, 109

(56) References Cited

U.S. PATENT DOCUMENTS

| | | | |
|---|---|---|---|
| 3,865,668 | 2/1975 | Holson . | |
| 4,460,637 | 7/1984 | Miyamoto et al. . | |
| 4,555,437 | 11/1985 | Tanck . | |
| 4,642,247 | 2/1987 | Mouri et al. . | |
| 4,702,026 | 10/1987 | Shaine . | |
| 4,741,969 | 5/1988 | Hayama et al. . | |
| 4,956,230 | 9/1990 | Edwards et al. . | |
| 5,198,306 | 3/1993 | Kruse . | |
| 5,513,457 * | 5/1996 | Byrnes et al. | 40/405 |
| 5,558,454 | 9/1996 | Owen . | |
| 5,662,997 | 9/1997 | Onishi et al. . | |
| 5,714,245 | 2/1998 | Atherton et al. . | |
| 5,836,710 | 11/1998 | Owen . | |

FOREIGN PATENT DOCUMENTS

WO 92/16375 10/1992 (IT) .

* cited by examiner

*Primary Examiner*—Bruce H. Hess
*Assistant Examiner*—B. Shewareged
(74) *Attorney, Agent, or Firm*—Robert Luke Walker

(57) ABSTRACT

A jacket for one or more printed sheets, such as photographic prints, has a holder having at least one pocket. The pocket defines a space for the printed sheet. The holder has a transparent ink receptive layer exterior to the space. The ink receptive layer can have a deposit of invisible ink that is an encodement of information that, preferably, relates to the respective printed sheet. Two or more such jackets can be bound together to provide an album.

23 Claims, 5 Drawing Sheets

PHOTOGRAPHIC JACKET AND ALBUM

CROSS REFERENCE TO RELATED APPLICATIONS

Reference is made to commonly assigned, U.S. Pat. No. 6,139,210 issued Oct. 31, 2000.

FIELD OF THE INVENTION

The invention relates to photography and more particularly relates to a photographic jacket and album.

BACKGROUND OF THE INVENTION

Recording data relating to the taking of a picture has many potential applications for a photographer. For example, the date, time and location that the picture was taken can be used later in organizing prints. Sound can also be captured at the time of picture taking or later as an annotation. The recent advances in magnetic and optical storage on film, and digital memory have made it very practical to store this supplemental data on the film or in the camera.

Supplemental information relating to particular prints can be stored on separate media that is stored with the prints. For example, supplemental information can be stored on magnetic discs or tapes, or electronic memory elements, or on optical memory elements. This approach has the shortcoming that corresponding prints and media must be physically separated to retrieve the stored information. For example, a magnetic disc is placed in a disc drive to access information. There is a risk that, once separated, the prints and corresponding media will not be reassociated properly after information retrieval.

Supplemental information can be recorded on or attached to a print. For small amounts of supplement information, it is practical to print alphanumeric information directly on the front or back of the print. For large amounts of supplemental information, this is impractical, particularly on the front of the print. Supplemental information can be recorded in media attached to the print. For example, a magnetic strip can be placed on a front or back surface of a print. This is cumbersome, particularly for retrieving the information. A non-image area can be added to the print to accommodate the supplemental information. For example, a visible bar code can be placed on a non-image area of a front surface of a print. This is also cumbersome, since the image area must be reduced or the overall size must be increased to add the non-image area.

The reverse side of a photographic print is available for supplemental information such as a bar code placed on the print or affixed on a sticker. This approach has the shortcoming that the supplemental information is unavailable unless access is provided to the back of the print. In photo albums, this doubles the thickness, since alternate pages present faces and backs of photographic prints.

Photographic albums are known in which supplemental information is recorded in the album leaf rather than photographic prints retained by the leaf. Some of these albums use incorporated playback devices. This adds complexity and, if repeated for each page, is costly. Other albums have memory storage units for each leaf or page. Removable memory units present a risk of loss. Non-removable memory units attached to the leaves are cumbersome to use. Visible printing on album leaves presents the same problems as on photographic prints.

Systems are known for storing supplemental information on photographic prints or other printed material using printed matter which is invisible to the human eye under normal viewing conditions. U.S. patent application Ser. No. 08/931,575, filed Sep. 16, 1997, discloses the use of a printed invisible encodement on a photographic image to record sound information. The encodement is read by illuminating using a beam of invisible electromagnetic radiation that is subject to modulation by the encodement. The resulting encodement image is captured, decoded, and played back. The invisible radiation image is captured using a reader that is capable of capturing only invisible images within a selected band. (The term "band" is used herein to refer to one or more contiguous or non-contiguous regions of the electromagnetic spectrum. The term "invisible" is used herein to describe material which is invisible or substantially invisible to the human eye when viewed under normal viewing conditions, that is, facing the viewer and under sunlight or normal room illumination such as incandescent lighting.) The invisible image is produced by development of a photographic emulsion layer, inkjet printing, thermal dye transfer printing or other printing method. The encodement is a one or two-dimensional array of encoded data. This approach is convenient, but requires printing on the face of the photographic prints. It is likely that for many people, subjecting valued photographs to a elective modification, and thus risking damage or loss, is unacceptable.

Photographic album pages and other photograph mounts have been made using a variety of different constructions. U.S. Pat. No. 4,702,026 discloses album pages having a pair of flexible, transparent plastic sheets sealed together to form pockets. U.S. Pat. No. 3,865,668 discloses album pages having transparent plastic overlay sheets on each side of a support. U.S. Pat. No. 5,836,710 discloses a folded-over plastic or paper page that is printable by a laser or inkjet printer.

It would thus be desirable to provide an improved photographic jacket which holds a photographic print and invisibly stores supplemental information about the photographic print.

It would also be desirable to provide an improved photographic jacket in which supplemental information is accessible without removal of the photographic print from the photographic jacket.

SUMMARY OF THE INVENTION

The invention is defined by the claims. The invention, in its broader aspects, provides a jacket for one or more printed sheets, such as photographic prints, has a holder having at least one pocket. The pocket defines a space for the printed sheet. The holder has a transparent ink receptive layer exterior to the space. The ink receptive layer can have a deposit of invisible ink that is an encodement of information that, preferably, relates to the respective printed sheet. Two or more such jackets can be bound together to provide an album.

It is an advantageous effect of at least some of the embodiments of the invention that an improved photographic jacket is provided which holds a photographic print and invisibly stores supplemental information about the photographic print.

It is another advantageous effect that an improved photographic jacket is provided in which supplemental information is accessible without removal of the photographic print from the photographic jacket.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
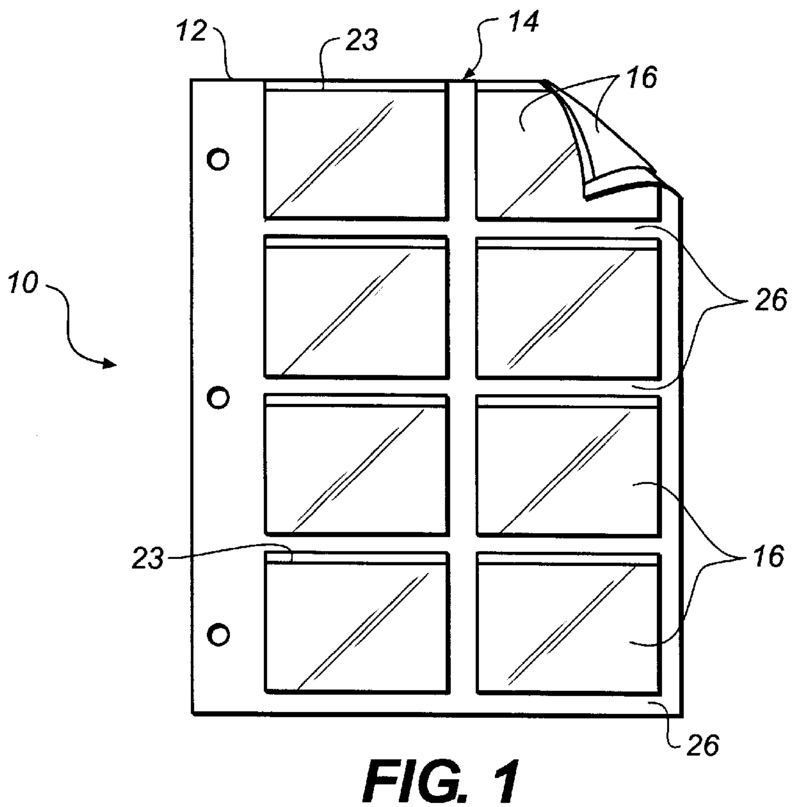
FIG. 1 is a front view of an embodiment of the photograph jacket.

Referring initially to FIGS. 1–6, the jacket 10 has a holder 14 having one or more pockets 16 for printed sheets 18, such as photographs or other viewable printed matter in sheet form. The printed sheets 18 can be viewed within the pockets 16. The holder 14 has an ink receptive layer 20 exterior to the pockets 16. After printing, the resulting printed jacket 10 has an ink deposit 22 layered on the ink receptive layer 20 (not shown in FIGS. 1–6). The ink deposit 22 is transparent to visible radiation. It is highly preferred that the ink deposit 22 is completely invisible under ordinary viewing conditions, that is, the ink deposit 22 absorbs or emits little, if any, light in the visible region of the electromagnetic spectrum (i.e. in the range of about 400 nm to about 700 nm).

The ink deposit 22 does produce a detectable image in a radiation band outside the visible spectrum, as a result of reflection, transmission, or luminance. The frequency range or ranges of the invisible radiation modulated by the ink deposit 22 is dependent upon the characteristics of the material used for the ink deposit 22. Depending upon the material, infrared radiation or ultraviolet radiation or both can be used. In preferred embodiments of the invention the material absorbs or emits in the infrared (IR) region of the spectrum, in particular the light absorbs light between 800 nm and 1200 nm. Preferably, the material absorbs light above about 850 nm. In the event the material absorbs some light in the visible region, the material should be used at relatively low concentration so that the material can be detected by the sensor yet will not interfere with viewing any underlying information or image.

The ink is deposited on the ink receptive layer 20 on an image-wise basis. The image formed by the ink deposit 22 is preferably that of one or more encodements such as two-dimensional bar codes. Each encodement overlies a particular pocket and is, preferably, encoded with supplemental information relating to the underlying printed sheet 18. A printed sheet can be associated with the encodement by placing and keeping the printed sheet in the respective pocket. The data in the encodement can include subject specific information, such as sound recorded when the picture was taken, for playback at the time of viewing the photographic print or other use. The form of the encoded data is not critical to the invention. For example, the encodement can be in accordance with Standard PDF 417 and the LS49042D Scanner System marketed by Symbol Technologies, Inc., of Holtsville, N.Y.; or the encodement scheme marketed as Paper Disk by Cobblestone Software, Inc., of Lexington, Mass.

A two-dimensional bar code can store a large data block. The amount of encoded data stored depends on the size of the surface bearing the ink deposit 22. For example, if the surface is 4" by 5" the bar code can store up to 80,250 pixels of data. In general the data stored is at least 500 pixels per square inch, preferably at least about 1000 pixels per square inch and most preferably at least about 1500 pixels per square inch. In general the data stored is between about 500 and 5000 pixels per square inch, preferably between about 1000 and 5000 pixels per square inch and most preferably about 1500 and 5000 pixels per square inch.

A visible ink image can additionally be printed on the ink receptive layer 20, if desired; however, such a visible image is of limited usefulness, since the visible image interferes with viewing of the underlying photograph. The term "visible image" is used herein in a broad sense that is inclusive of marks, such as lines and borders; pictorial content; and alphanumeric characters and other indicia.

The holder 14 has one or more pockets 16. The number and arrangement of pockets 16 can be adjusted to meet different usages. Pockets 16 can be separated by dividers 26. Each pocket 16 has a front face sheet 28*a* and defines an empty space 30 behind the face sheet 28. Behind the space 30 is a backing 34 or a rear face sheet or rear sheet 28*b or both. The backing can be opaque or transparent and does not have an ink receptive layer 20. The rear face sheet 28b* has the same features as the front face sheet 28*a*.

The empty space 30 can receive and support one or more printed sheets 18. For convenience, printed sheets 18 are generally treated herein as having a viewable image on only the front surface, but it will be understood that the printed sheet 18 could also have an image on the opposite surface which could also face a second face sheet (also referred to as a "rear face sheet 28*b* or rear sheet 28*b*"). It is generally desirable that the space 30 in each pocket 16 be sized to accommodate only a single printed sheet 18 or a pair of printed sheets 18 positioned back-to-back, since this allows full viewing of the front face of each printed sheet 18 and maintains the printed sheets 18 in position within the spaces 30 in an array predetermined by the arrangement of the pockets 16 of the album leaf 10.

The outward configuration of the jacket 10 is not critical. Referring to FIGS. 1–4, the jacket 10 is an album leaf having a binding edge 12 and a holder 14, which are joined together as a continuous piece, or by a fastener, or adhesive or the like. The binding edge 12 can be continuous with and the same material as the holder 14 or can be made of a different material and adhered or fastened to the holder 14. The binding edge 12 can be reinforced relative to the holder 14, if desired. The binding edge 12 is adapted to receive a binding 25. A plurality of album leaves 10 are connected together using the binding 22 to provide an album 24. A wide variety of different binding edges 12 can be used as appropriate for particular bindings 22. For example, the binding edge 12 can have series of spaced holes and the binding 22 can be a multiple ring binder or similar retainer. The binding edge 12 can have a flat portion and the binding 22 can be a compression binder or stitched book binding.

Figure 2:
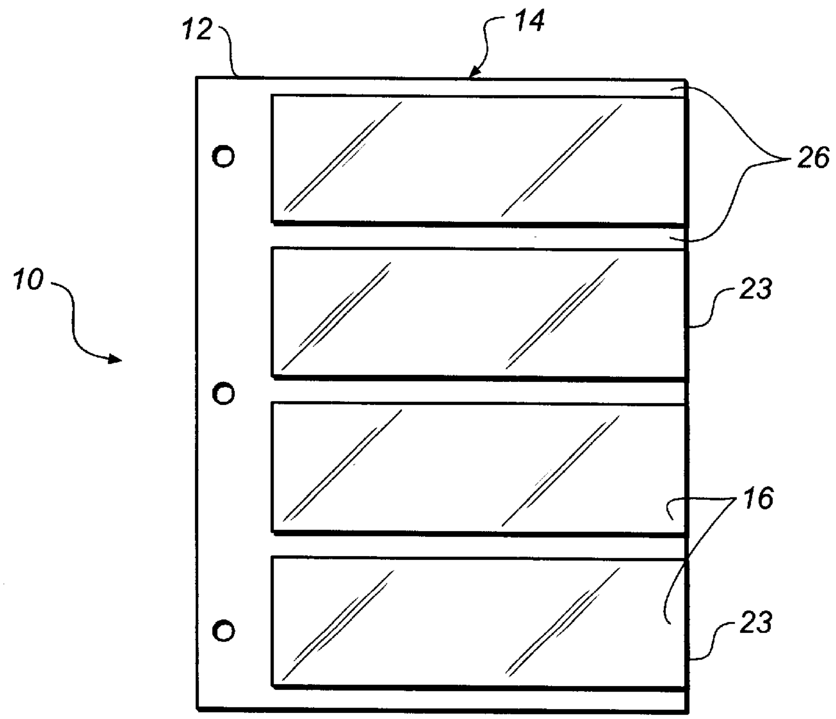
FIG. 2 is a front view of another embodiment of the photograph jacket.
Figure 3:
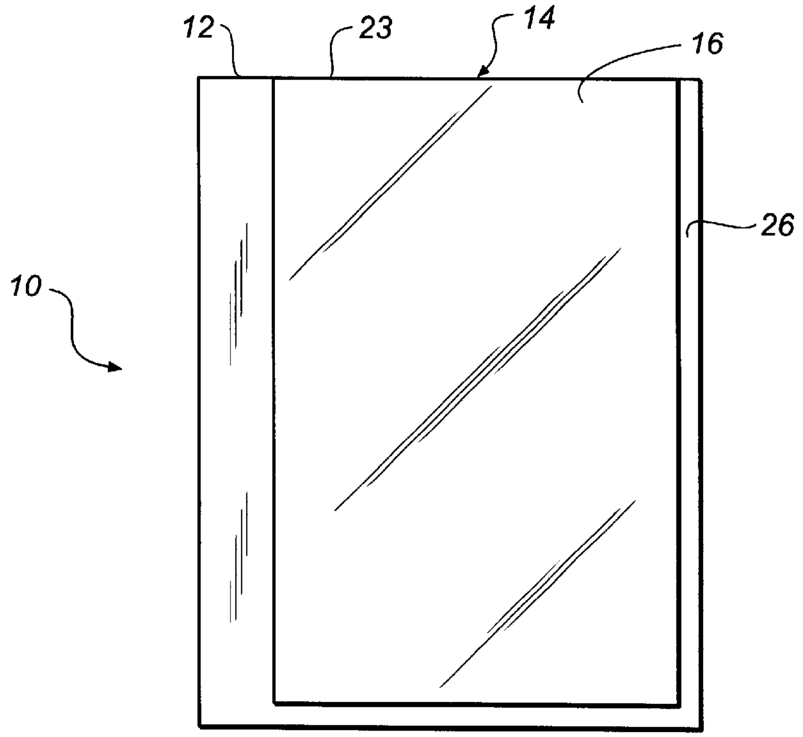
FIG. 3 is a front view of another embodiment of the photograph jacket.
Figure 4:
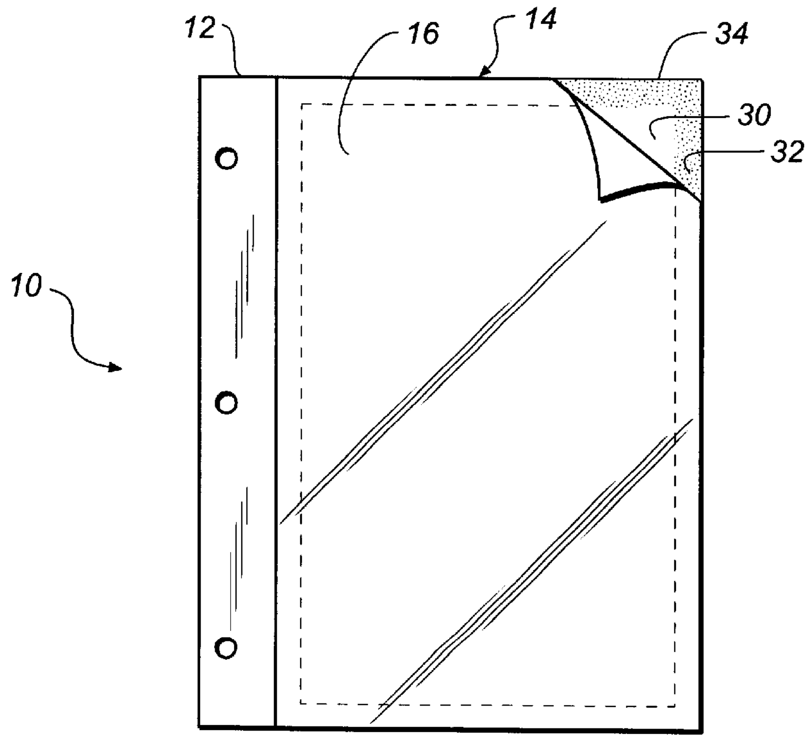
FIG. 4 is a front view of another embodiment of the photograph jacket. The face sheet is reversibly releasable and is shown peeled down from one corner.

In FIGS. 1–3, the jackets 10 are flexible and each pocket has an opening 23 on one side. In FIG. 4, the face sheet 28 is flexible and is adhered to a flexible or rigid backing 34 by a layer 32 of adhesive. The face sheet 28 is reversibly removable from the backing 34 for placement and removal of printed sheets 18 from the space 30.

Figure 6:
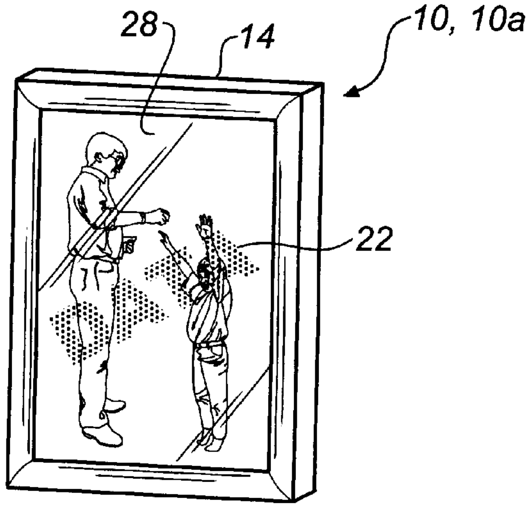
FIG. 6 is a perspective view of another embodiment of the photograph jacket.

In the embodiment shown in FIG. 6, the jacket 10 is three-dimensional. The holder includes a divider in the form of a picture frame and a face sheet joined to the frame. (A backing also joined to the frame is not shown.) The printed sheet 18 is held behind the face sheet within a pocket. The ink receptive layer (not shown in FIG. 6) can be on either or both surfaces of the face sheet. With some face sheets, it may be necessary to use a printer designed for use on thick substrates, such as the printer disclosed in PCT Patent publication WO 92/16375 published Oct. 1, 1992.

The jacket 10 can have other configurations and is not limited to a particular size or shape, except as required by a particular printed sheet. The printed sheet 18 in the pocket 16 or pockets 16 of the jacket 10 can be photographic prints or other printed matter or even non-printed matter. The jacket 10 is particularly advantageous, in terms of convenience and cost, in the form of an album leaf used to hold photographic prints. As a matter of convenience, the jacket 10 is discussed herein primarily in terms of viewable printed matter (also referred to herein as "printed sheets 18") and album leaves. It will be understood that like considerations apply to other jackets 10 such as picture frames and to other uses. Likewise, as a matter of convenience, the invention is generally discussed herein in terms of inkjet printable album leaves. It will be understood that the photographic jacket 10 is not limited to any particular printing method. Ink and holder 14 compositions can be varied to meet the requirements of different printing methods.

Figure 7:
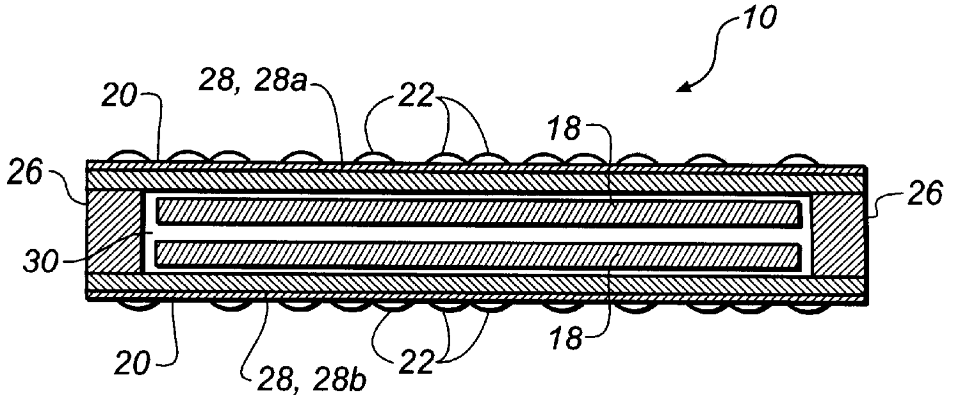
FIG. 7 is a partial transverse cross-sectional view of the photograph jacket of FIG. 1. Only a single pocket is shown. A pair of printed sheets are shown positioned back to back within the pocket. Dimensions in the cross-sections shown herein are exaggerated for clarity and to allow easy comparison of the different cross-sections. Thicknesses are exaggerated in this and other figures for clarity.
Figure 8:
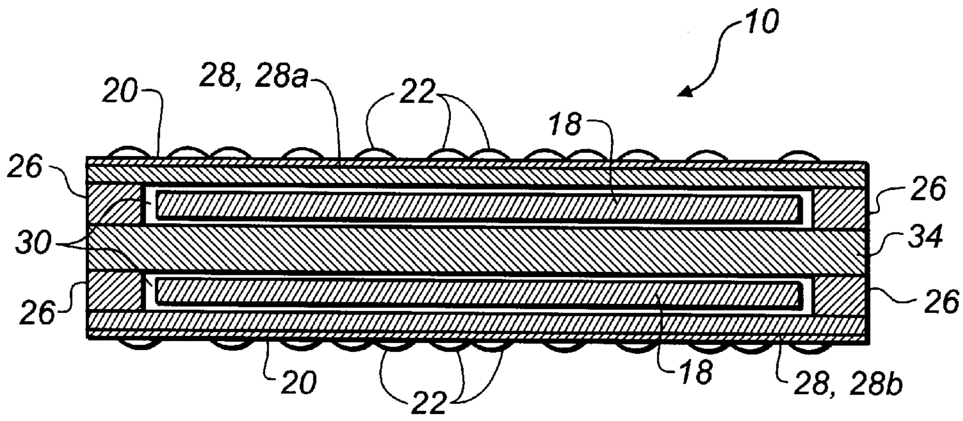
FIG. 8 is a transverse cross-sectional view of the photograph jacket of FIG. 3. A pair of printed sheets are shown in a pair of opposed pockets.
Figure 9:
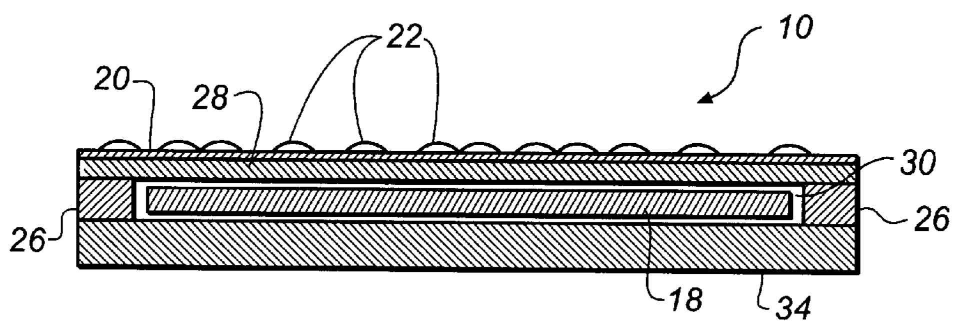
FIG. 9 is a transverse cross-sectional view of the photograph jacket of FIG. 4. A printed sheet is shown in the pocket.
Figure 10:
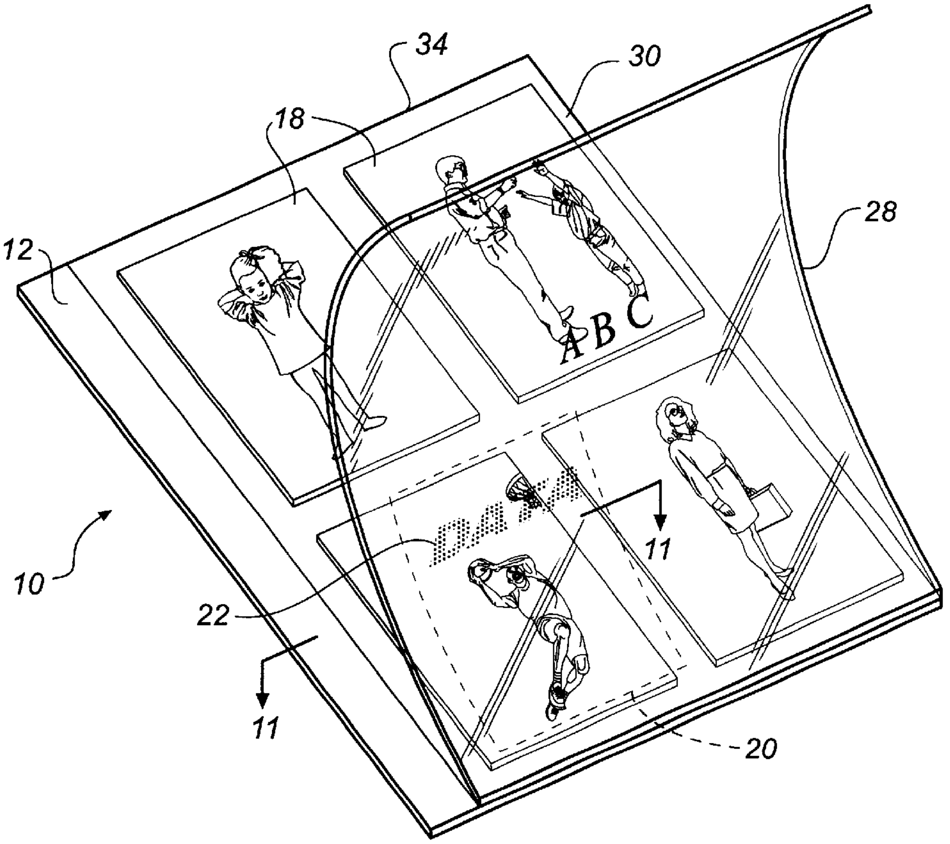
FIG. 10 is a perspective view of another embodiment of the photograph jacket. The face sheet is reversibly releasable and is shown peeled down from the top.

Referring now to FIGS. 7–9, the face sheet 28 and adjoining backing 34 or adjoining face sheets 28*a*,28*b* are connected together at the dividers 26 (illustrated in FIGS. 7–9 and 11–12 schematically as boxes). The dividers 26 are each formed by a juncture between the face sheet 28 and backing 34 or adjoining face sheets 28*a*,28*b* and can include an interlayer of adhesive or double sided tape or the like. A face sheet 28 can be reversibly releasable from the juncture or can be permanently attached. The juncture can also be an adhesive free union provided by sonic welding, solvent welding or other means. Mechanical fasteners are usable, but cumbersome and not preferred. Referring to FIG. 8, the album leaf can have a pair of face sheets 28*a*,28*b* and a corresponding pair of spaces 30 on either side of a backing 34. In FIG. 7, the backing 34 is not present. In this case, front face sheet 28*a* is joined to a rear face sheet 28*b* at the junctures 36.

In the embodiments shown in FIGS. 7–9, exterior to each face sheet 28 is an ink receptive layer 20. This ink receptive layer 20 can be a region of the face sheet 28 having the same composition as the rest of the face sheet 28 or can consist of a single coating or multiple coatings overlying the face sheet 28. The ink receptive layer 20 can be continuous across the entire album leaf 10 or can be discontinuous. For example, the ink receptive layer 20 can be interrupted at dividers 26.

Figure 11:
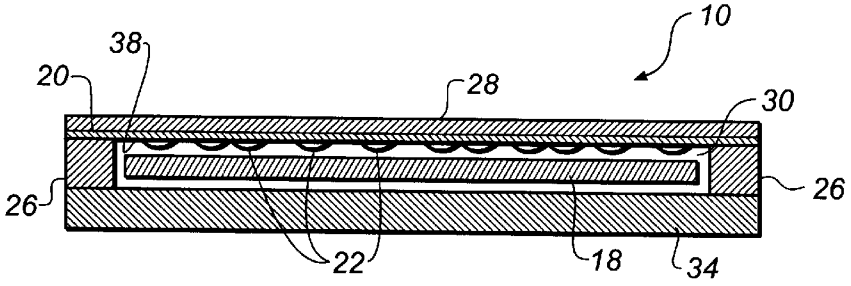
FIG. 11 is a partial transverse cross-section of the photograph jacket of FIG. 10 taken substantially along line 11—11.
Figure 12:
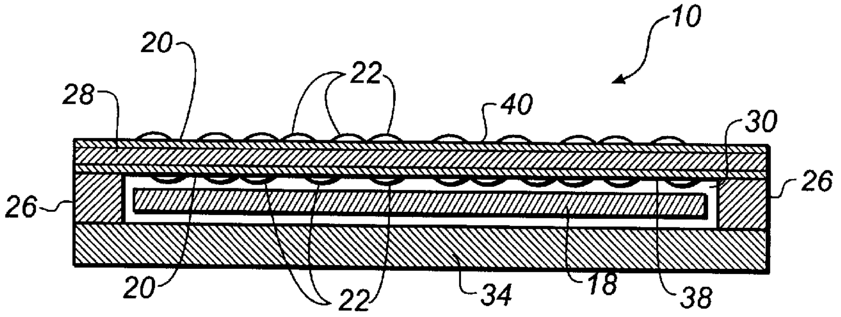
FIG. 12 is the same view as FIG. 11, but with the photograph jacket modified by additional of another ink receptive layer.

The ink receptive layer 28 can be on the inner surface 38 or the outer surface 40 of the face sheet 28. Ink receptive layers 20 can be placed on both the inner and the outer surfaces of the face sheet 28. FIGS. 11–12 illustrate the jacket 10 of FIG. 9 modified by placing the ink receptive layer 20 on the inner surface of the face sheet 28 and both surfaces of the face sheet 28, respectively. Similar modifications can be made in the jacket configurations shown in FIGS. 7–8 and other jacket configurations. An ink receptive layer 20 on the inner surface 38 of the face sheet 28 is suitable for album pages having a releasable face sheet 28. The ink deposit 22 on the inside of the pocket 16 presents a risk of damage during photo placement and a risk of ink transfer from the ink receptive layer 20 onto the photograph or other printed sheet 18. On the other hand, wear and damage due to external contact is eliminated. A transparent ultraviolet light blocker can also be provided in the face sheet 28 to help protect against degradation of the ink deposit 22. Materials used as ultraviolet light blockers on photographic prints are suitable for this purpose, such as benzotriazole stabilizers marketed by Eastman Kodak Company of Rochester, N.Y. as Tinuvin®327 and Tinuvin®328.

Figure 5:
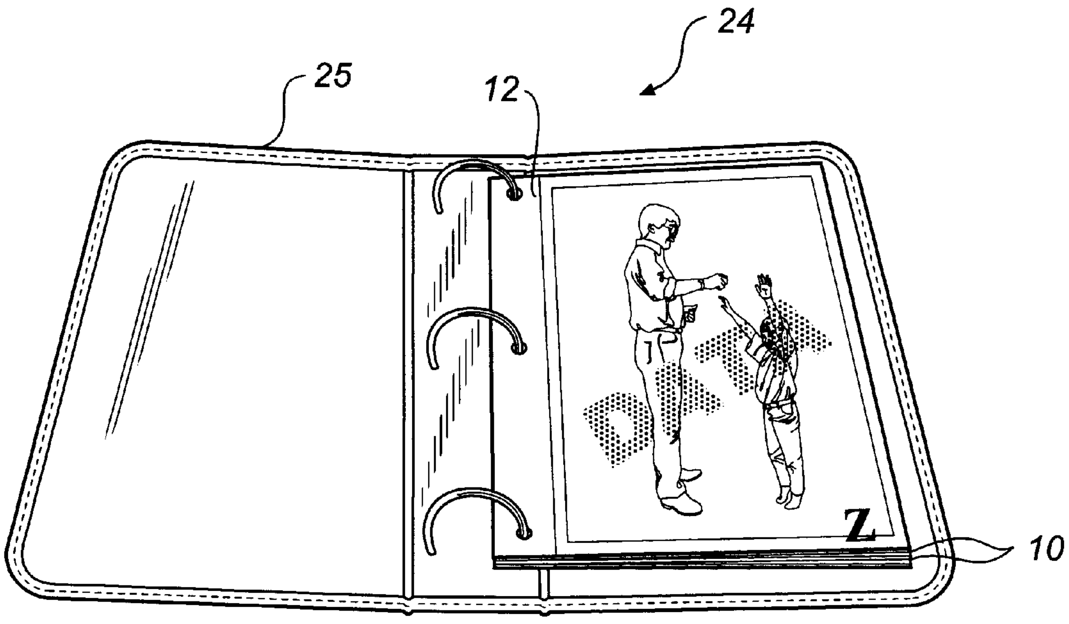
FIG. 5 is a perspective view of an embodiment of the album which includes a plurality of the photograph jackets of FIG. 3.

With the ink deposit 22 on the outer side of the pocket, there is no risk of transfer to the printed sheet, as long as the face sheet is impervious to the ink. The risk of transfer of the ink deposit 22 to the printed sheet 18 can also be avoided by limiting the usage of the inner surface 38 to non-transferring inks. For example, a manufacturer could print a trademark or other indicia in non-transferring ink on an ink receptive layer of an inner surface of a face sheet prior to permanent assembly of the jacket. The outer surface 40 would also have an ink receptive layer 20 for later use by a consumer. This is illustrated in FIG. 5. A trademark or the like on an inner surface of the face sheet 28 is indicated by the letter "Z".

The face sheet 28 supports and retains the ink receptive layer 20 and also holds the printed sheet 18 within the space 30. Suitable materials vary with intended use. For example, if the jacket 10 is a picture frame, then it is desirable that the face sheet 28 be sufficiently rigid to be self supporting. Suitable materials for the face sheet 28 in this use, include glass and acrylic plastic. If the jacket 10 is an album leaf, then it is preferred that the face sheet 28 is flexible.

The ink receptive layer 20 and face sheet 28 are both transparent to allow viewing of the printed sheets 18 within the pockets 16. This transparency is not perfect, but is preferably sufficient to not detract from the viewing experience. The album leaf can have one or more opaque or translucent regions (not shown), but it is highly preferred that the non-opaque regions be positioned to not overlie the front faces of the printed sheets 18 in the pockets 16.

The ink receptive layer 20 is adapted to adhere to the face sheet 28 and to receive ink deposited by a specific type of printer, such as an ink jet printer. Suitable combinations of materials for the face sheet 28 and ink receptive layer 20 are well known to those of skill in the art. (It will be understood that the terms "face sheet 28" and "ink receptive layer 20" can each be inclusive of multiple layers.)

In particular embodiments, the jacket is used with an ink jet printer and the face sheet 28 and ink receptive layer 20 can have the chemical and physical characteristics of ink jet transparencies and other receivers disclosed in U.S. Pat. Nos. 4,460,637; 4,555,437; 4,642,247; 4,741,969; 4,956, 230; 5,198,306; 5,662,997; 5,714,245. Because of its intended purpose, this embodiment of the photographic jacket 10 is subject to some constraints that distinguish the photographic jacket 10 from ordinary ink jet receivers. The photographic jacket 10 has a relatively complex structure. Except in embodiments having a releasable face sheet 28, the entire jacket 10 is placed at risk during printing. The part of the jacket 10 placed at risk during printing, the entire jacket 10 or the front cover, is not inexpensive. The printed photographic jacket 10 is printed to provide an invisible ink deposit 22 on one or more ink receptive layers 20. It is highly desirable that the ink receptive layers 20 are optimized for use with particular inks so as to reduce the risk of defective printed photographic jackets 10 having unreadable bar codes. This is particularly an issue for home printing using ink jet printers, since these printers often produce a copy that is initially wet and subject to smearing. It is also desirable that the ink receptive layer 20 and intended inks be simultaneously optimized to initially provide and maintain high resolution of the ink deposit 22.

Drying time is an especially important parameter for this usage, because the user cannot see when ink is being smudged by handling. For general use, it is preferred that the drying time for ink jet ink deposited on the ink receptive layer 20 is less than three minutes. One to two minutes drying time is more preferred and 15 seconds to one minute is still more preferred. These drying times are based on a determination of ink transfer or no transfer to bond paper pressed against the ink deposit 22. Drying time is a function of the amount of ink deposited and the area and other physical characteristics of the deposited ink, such as the concentration of infrared detectable material in the ink. For bar codes, these characteristics are fully predictable in a particular use. For example, bar codes printed on the jackets 10 have predictable sizes. For each unit area of a bar code, ink lay down is predictable and is generally limited to two values corresponding to the binary numbers 0 and 1. The size of a unit area and contrast required between different areas is a function of the detector used, the working range for that detector, and the materials used in the inks. Total coverage and distribution of ink in a bar code is a function of the allowable patterns provided by a particular code. With this in mind, inks and ink receptive layers 20 can be adjusted to provide a desired drying time.

The inks and ink receptive layers 20 and front covers can also be adjusted to have other characteristics known in the art for black and colored ink jet inks and ink receivers. For example, it is preferred that the jacket 10 not be subject to curling with changes in environmental humidity. It is desirable that the ink deposits 22, after drying, be resistant to fingerprints and have little or no stickiness. For most uses, it is desirable that the ink deposits be water resistant. It is desirable that a deposited dot of ink spread on the ink receptive layer 20 only to a limited extent and in a predictable manner. An acceptable increase in diameter of a deposited dot of ink is from 10 micrometers to 200–250 micrometers. Spreading to 180–200 micrometers is preferred and spreading to less than 180 micrometers is more preferred. It is preferred that the front cover and ink receptive layer 20 or layers in combination have a haze value, as measured by American Society for Testing and Materials standard: ASTM D 1003-97, of less than 10 percent (hereafter referred to as "haze value"). A haze value of less than 7 percent is more preferred and a haze value of less than 5 percent is still more preferred. It is preferred that the front cover and ink receptive layer 20 or layers in combination have a transmittance of more than 70 percent, as measured by American Society for Testing and Materials standard: ASTM D 1746-97. A transmittance of greater than 80 percent is preferred and greater than 90 percent is more preferred. The following patents disclose materials and methods relating to the above features: U.S. Pat. Nos. 4,460,637; 4,555,437; 4,642,247; 4,741,969; 4,956,230; 5,198,306; 5,662,997; 5,714,245.

Some ink receptive layers 20 having suitable drying times for use with these invisible ink jet inks are disclosed in U.S. Pat. Nos. 4,741,969; 4,555,437; 5,198,306; and 4,642,247. Ink jet transparencies having suitable ink receptive layers 20 are marketed by Eastman Kodak Company of Rochester, N.Y., as Kodak Inkjet Photo Transparency Film. Jackets 10 can incorporate these ink jet transparencies as front covers.

In certain embodiments of the invention, the invisible material is a luminescent material. A luminescent material is defined as any material which absorbs light and then emits light at another region of the electromagnetic spectrum which may be detected by some sensor device. While most luminescent materials absorb light at a particular wavelength and emit light at longer wavelength the materials of this invention are not limited to such restrictions. In fact materials where the opposite is true, materials sometimes referred to as up-converters or up-conversion materials would also be useful for this invention. Such materials are described in *Indian J. Of Pure and Appl. Phys.*, 33, 169–178, (1995). The invisible, luminescent materials can be either dyes, pigment, or any other material possessing the desired absorption properties. And the fluorescent dyes can absorb either in the UV, visible or in the infrared region of the electromagnetic spectrum at a concentration such that the data can be detected by a sensor and the data does not interfere with viewing the underlying information or image.

The following materials are useful in the practice of this invention.

Table 1 lists examples of suitable UV or visible absorbing materials which upon illumination with an appropriate light source, fluoresce in the visible or near IR region of the electromagnetic spectrum.

TABLE 1

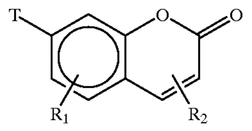

A

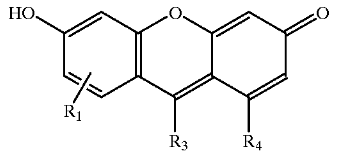

B

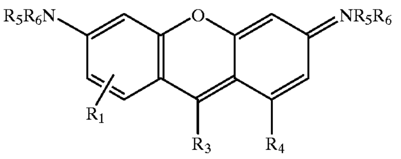

C

Compounds A, B, C are general representations of coumarins, fluoresceins and rhodamines respectively. Dyes of these classes are reviewed in *Appi. Phys.* B56, 385–390 (1993). These molecules are highly luminescent and may be useful for the present invention. $R_1$ represents any group including a hydrogen, substituted alkyl (per-halogenated, branched, saturated or unsaturated), halogen atoms (Cl, Br, I), any aryl group (phenyl, naphthyl, pyrrlyl, thienyl, furyl, etc.) or acyl (amido, ester, or carboxy), any sulfonic acid groups or derivatives of sulfonic acids (sulfonamides, sulfuryl halides, nitro, or substituted ether group. In general $R_1$ could be any group that allows these compounds to remain luminescent. T represents any of the following groups, OH, substituted or unsubstituted amino, a substituted amino group where the amino is a member of any ring, fused or otherwise. $R_2$ can be any substituted alkyl, aryl or acyl groups (perfluoronated alkyl groups are particularly useful in this position). $R_3$ can be hydrogen, or substituted alkyl. When $R_3$ is aryl or CN these dyes are particularly useful for the present invention, these dyes absorb in the IR region of the electromagnetic spectrum. $R_4$ can be any substituted alkyl, aryl or acyl groups (perfluoronated alkyl groups are particularly useful in this position). $R_5$ and $R_6$ can be hydrogen atoms or any combination of alkyl groups. $R_5$ and $R_6$ can represent groups necessary to form any ring (e.g. pyrrole, pyrimidine, morpholine or thiomorpholine). $R_5$ and $R_6$ may be part of a bicyclic ring system, fused onto the phenyl ring as shown in the general structure below.

D

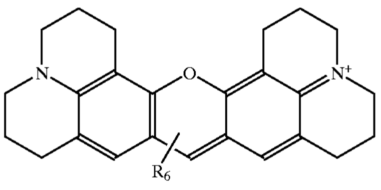

Fused molecules of this type are reviewed in *Tetrahedron*, Vol. 34, No.38, 6013–6016, (1993). The impact of annulation on absorption and fluorescence characteristics of related materials is described in *J. Chem. Soc., Perkin Trans.* 2, 853–856, (1996).

TABLE 2

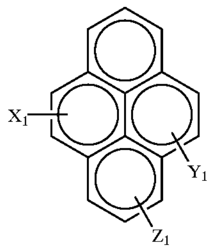

E

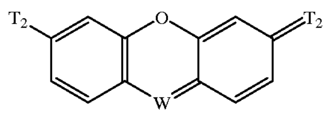

F

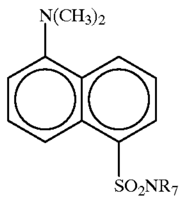

G

Aromatics (polycyclic aromatics especially) such as shown in Table 2 are useful for this invention. $X_1$, $Y_1$, $Z_1$ can be any groups which allow these compounds to be luminescent. In F, $T_2$ represents any substituted or unsubstituted amino or substituted or unsubstituted oxygen and W can be carbon, or nitrogen. These compounds are particularly useful when $X_1$, $Y_1$ or $Z_1$ are donor and acceptor groups on the same molecule as depicted on the so called "dansyl" molecule depicted as compound G. Anthracenes, pyrenes and their benzo derivatives are examples of fused aromatics. These materials are can be used individually or in combination with multiple components to form complexes which are luminescent. Sulfonated polyaromatics are particularly useful in water-based ink formulations. Lucifer yellow (H) dyes are often soluble in water and are comparatively stable and are described in *Nature*, 292, 17–21, (1981).

H

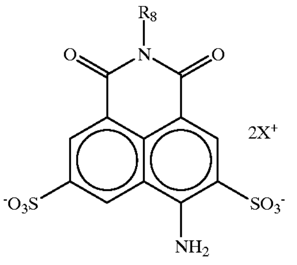

The commercial Lucifer yellow dyes were H where $R_8$ is any alkyl and $X^+$ represents a cation, necessary to balance the negative charge is useful for this invention The merits of this type of molecule and its luminescent properties have been disclosed in U.S. Pat. No. 4,891,351 for use in thermal transfer applications.

TABLE 3

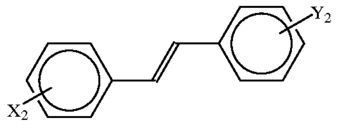

I

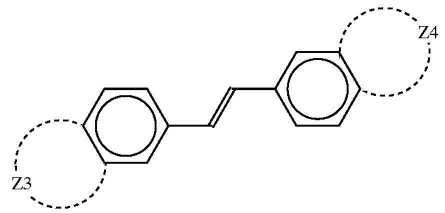

J

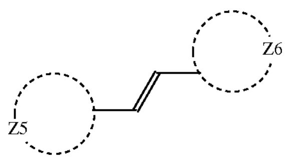

K

The stilbene class of dyes Table 3 are useful for the present invention. These dyes are very commonly used commercially as optical brighteners for paper stock. *Colourage* 47–52, (1995) reviews fluorescent stilbene type lumiphores. For this invention $X_2$ and/or $Y_2$ can be any substituent or group that promotes absorption of this chromophore in the UV or short wavelength visible and subsequently emits light in the visible. Examples include but are not limited to halogens (Cl, I, etc.), alkyl (methyl, ethyl, butyl, iso-amyl, etc.) which may be used to increase organic solubility, sulfonic acid and its derivatives which may be useful for increasing water solubility, carboxylic acid groups which may be used for solubility but also as a position of oligomerization or polymerization. Also useful are amine derive substituents, which can be used to append groups for solubility purposes and polymerization but additionally may be used to manipulate the absorption characteristics. Stilbenes where $X_2$ and $Y_2$ are comprised of groups which allow for a donor and acceptor molecule in the same molecule are particularly. useful for this purpose. In structures J and K, $Z_3$, $Z_4$, $Z_5$, and $Z_6$ represent any atoms that can be used to form a ring of any size or substitution with the proviso that the material is still luminescent. For structure K, it is noteworthy that $Z_5$ and $Z_6$ represent heteroaromatic nuclei, such as benzoxazolium, benzothiazolium, benzimdazolium, or their naphthalene derivatives, which make these compounds highly fluorescent.

TABLE 4

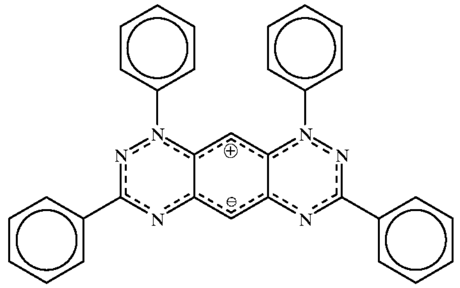

L

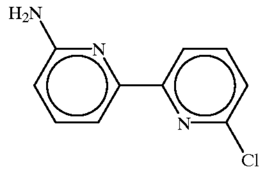

M

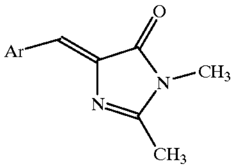

N

Table 4 shows some highly fluorescent amine heterocycles that would be particularly useful for this invention. The highly fluorescent tetraphenylhexaazaanthracene (TPHA, L) is atmosphere stable and thermally stable up to 400° C. (see *J. Am. Chem. Soc.* 120, 2989–2990, (1998)and included references). Such properties would be extremely useful for encodement of data where archival stability is expected to be an important issue. The diaminobipyridine compound M, described in *J. Chem. Soc., Perkin Trans.* 2, 613–617, (1996)was found to be highly fluorescent. The benzimidazalones N, such as disclosed in *Tetahedron Letters*, 39, 5239–5242, (1998), are also highly fluorescent when incorporated into certain environments. The aromatic group (Ar)can be a simple phenyl or more intricate heteroaromatic groups (imidazolo, benzoxazolo, indole, etc.).

Table 5 contains another general class of useful dyes for the application described in the present invention.

TABLE 5

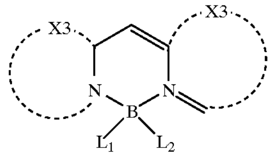

O

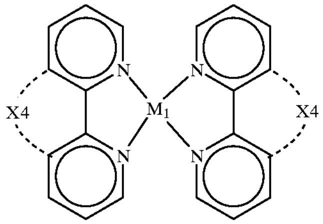

P

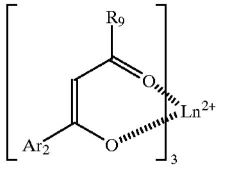

Q

Compounds O, P, and Q represent several classes of metallized dyes which are included in the scope of the present invention. Boron complexes such as compound (O) are very fluorescent, stable and easily synthesized from commercially available materials. Such materials are disclosed in *J. Am. Chem. Soc.* 116, 7801–7803, (1994). X3 represents atoms necessary to form an aromatic or heteroaromatic ring, $L_1$ and/or $L_2$ could be halogens, ether or any other ligand which commonly has an affinity for boron metal. Bipyridyl metal complexes such as (P) are luminescent, as disclosed in *Chem. Rev.*, 97, 1515–1566, (1997)). Due to the described optical properties is highly conceivable that such complexes would be useful for the present invention. X3 could be an atom which form either an aromatic fused ring forming a phenanthroline complex or saturated ring which could restrict from rotation the bipyridyl functions. $M_1$ represents any metal that would provide a luminescent complex (e.g. Ru or Re)or a metal which when complexed with the bipyridyl ligand quenches luminescence in a photographic manner. Compound (Q) represents the lanthanide complexes which are useful for thermal transfer imaging as disclosed in U.S. Pat. No. 5,006,503. Lanthanide metal complex dyes have UV absorbance and typically large Stokes' shifts.

TABLE 6

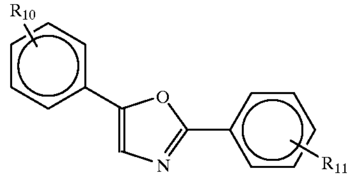

R

TABLE 6-continued

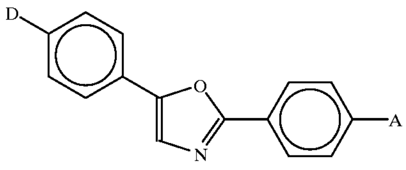

S

Dyes such as the phenyloxozolium compounds, generally depicted as in Table 6, are very fluorescent and have the added feature that the fluorescent signal is long lived, as disclosed in *Photochemistry and Photobiology*, 66 (4), 424–431,(1997). When the R-groups represent donor (D) and acceptor (A)groups on the same molecule as depicted in structure S, then these materials possess superior luminescent properties.

The materials discussed in the previous examples absorbed light in either the UV or visible region of the electromagnetic spectrum. These materials have several advantages for use in the application described in the present invention. Often the materials are atmospherically stable, they are commercially available since they have been used extensively in non-photographic applications and finally good optical properties can been had (e.g. large Stokes' shifts, high fluorescence quantum yield, long excited state lifetimes, etc. The materials in the next series of examples absorb light in the IR and for the most part emit further into the IR. Since these materials emit beyond the absorption of the other possible colorants on articles, IR luminescent materials can be detected easier from background colorants. The next several materials are typical IR materials useful for this invention.

TABLE 7

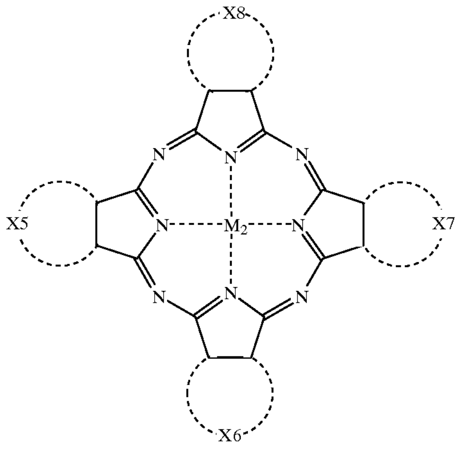

T

Table 7 contains a general structure depicting a phthalocyanine or naphthalocyanine compound. Phthalocyanines are well known in the Infared Absorbing dyes: Topics in Applied Chemistry, Edited by Masaru Matsuoka, New York, Plenum Press, 1990. These materials have been used in electroconductive applications, as absorber dyes for photothermographic printing and as colorants in inks. Several well known properties of the phthalocyanines and their extended analogs, naphthalocyanines, are high fluorescence efficiencies and superior thermal and light stability. Such materials are disclosed in *Dyes and Pigments*, 11, 77–80, (1989); *Aust. J. Chem.*, 27, 7–19, (1974); and *Dyes and Pigments*, 35, 261–267, (1997). These properties make these materials ideal for storage of large data amounts for extended periods as described in this invention. Compound T depicts a general structure of a phthalocyanine or naphthalocyanine. X5, X6, X7 and X8 represent atoms necessary to form a ring. The ring is often aromatic or heteroaromatic such as phenyl, 1,2-fused naphthyl, 1,8-fused naphthyl or larger fused polyaromatics such as fluoroanthrocyanine. The rings may be substituted in any way in the spirit of this invention provided that the materials is still luminescent. In fact differential substitution can be used to attenuate the physical properties (e.g. light stability and solubility) or enhance the optical properties of a material (e.g. Fluorescence efficiency or Stokes' shift). The rings may contain functional groups through which oligomerization can be accomplished. The (X5–8)-groups may be the same or different leading to symmetrical or unsymmetrical materials respectively. The metal atom ($M_2$)can be any metal with the proviso that it allows for luminescent materials. The substituent $M_2$ can also represent two hydrogen atoms, these materials are usually referred to as "non-metallized" (na)phthalocyanines. Some metals can possess additional "axial" ligands (e.g. Al and Si) which are useful for appending additional functional groups to alter the properties of the dyes. Additionally these groups prevent chromophore aggregation which may perturb the luminescent properties of the chromophores. These ligands also useful points of attachment to oligerimerize or form dendrimers of these materials as disclosed in *Thin Solid Films*, 299, 63–66, (1997) and *Angew. Chem. Int. Ed.* 37 (8), (1092–1094), (1998). A related class of materials is depicted in Table 8. Compound U is classified as a "sub"-phthalocyanine and is disclosed in *J. Am. Chem. Soc.* 118, 2746–2747, (1996)). These materials are very fluorescent. The sub-naphthalocyanines with the proper substitution can absorb in the near IR and have Stokes' shift comparable if not larger than the analogous naphthalocyanines.

TABLE 8

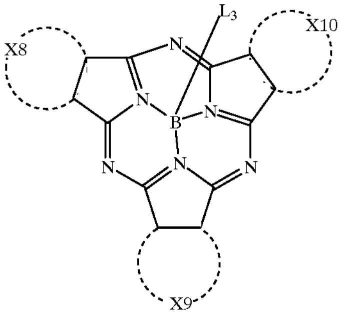

U

The group $L_3$ is like similar "axial substituents on phthalocyanines. These groups may be useful for modifying the properties of the materials. Also like phthalocyanines, these groups are expected to prevent chromophore aggregation which may perturb the luminescent properties of the chromophores.

TABLE 9

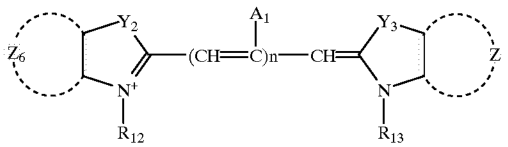

V

Cyanines such as depicted in structure V are luminescent and useful for this invention. In the above structure n could be 0 or any integer (e.g. 1–4) and A is a group that is appended to the central chain carbon or atom. The group A, can be any alkyl, aromatic or heteroaromatic group. A can be any group with the proviso that the dye is still luminescent. Y2 and Y3 could be independently one of the following groups: N, O, S, Se, or Te, additional C(alkyl)$_2$ which forms the indole nucleus, well recognized by anyone skilled in the art as an indole ring. Additionally when $Y_2$ or $Y_3$ is nitrogen then it is substituted with an appropriate group, forming what is recognizable as an imidazolium ring by any skilled in the art. $Z_6$ and $Z_7$ represent atoms necessary for forming a saturated aromatic or unsaturated non-aromatic ring. The ring so formed could be phenyl, naphthyl or any other fused aromatic. Likewise the ring could be any aromatic or non-aromatic heteroatom containing ring (e.g. pyridyl, quinoyl, etc.) $R_{12}$ or $R_{13}$ represent any of the possible nitrogen substituents well known by any skilled in the art. For example, $R_{12}$ or $R_{13}$ may be independently saturated substituted or unsubstituted alkyl (e.g. methyl, ethyl, heptafluorobutyl, etc.)or non-saturated alkyl (vinyl, allelic, acetylinic). $R_{12}$ and $R_{13}$ may also be charged groups (cationic, anionic or both). In cases where the $R_{12}$ and or $R_{13}$ are charged and a net charge exists on the dye, there exist a combination of counterions to balance the charge. For example, if $R_{12}$ and $R_{13}$ are both sulfoalkyl the net charge on the chromophore may be −1 and hence would be charge balanced with an appropriate cation (e.g. Na+, K+, triethylammonium, etc.) Likewise if $R_{12}$ and $R_{13}$ are simple uncharged alkyl groups such methyl, then the dye may have a net +1 charge and hence have to be charge balanced with a negative anion (e.g. perfluorobutyrate, I—, BF4—, etc.). $R_{12}$ and $R_{13}$ could be groups necessary to incorporate the material in an oligomer or polymer. The dye may be incorporated into the polymer backbone or pendant. Additionally the polymer may incorporate this material by non-covalent forces (charge-charge interactions, encapsulation, etc.). Long chain cyanines are often bridged. It is known that such bridging has a stabilizing effect on cyanine dyes and stability is a preferred embodiment here such dyes are preferred. The bridge could be any saturated structure of any size, preferably 5, 6, 7 membered. Such ring may be functionalized with the usual groups alkyl (e.g. methyl, t-butyl) carboxlic acid (and its derivatives), sulfonic acids (and its derivatives) halogen, aromatic and heteroaromatic. Group B could be the usual chain substituents, halogen (preferable Cl), phenyl, heteroaryl (e.g. furyl, thienyl, etc.), ethereal (e.g. ethoxy, phenoxy, benzyloxy), or barbiturate, mercapto (e.g. thiophenoxy, thiobenzyloxy, etc.), amino (e.g. anilino, etc.). B1 could represent a point of attachment for oligomerization or polymerization. It is noted that m represents an integer from 1–3 as dyes containing such bridging are well known in the art. Z groups represent atoms necessary to for fused rings. Each Z group represents any ring which allows these dyes to be luminescent. $Y_4$ and $Y_5$ represent atoms necessary to form the typical dye nuclei and could anything which allows the material to be luminescent. The material shown in Table 11 illustrates another useful feature. X11 and X12 represent the atoms necessary to for a ring from the nitrogen atom of the hetero-nucleus to the chromophore chain. Typically forming a 5-member or six member ring. Ridigization of chromophores as depicted in the materials of Tables 10 and 11 is known to enhance the luminescence.

TABLE 10

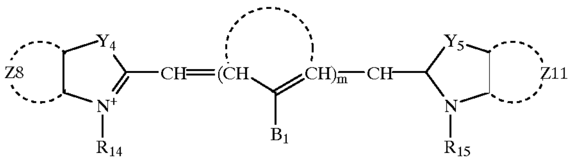

W

TABLE 11

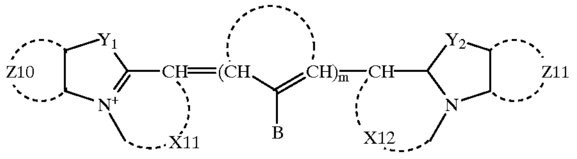

X

Another well known class of luminescent materials is depicted in Table 12. This class of materials are known as squaraine dyes or squarylium dyes. The use of organic solubilized squaraines for antihalation protection in HZ sensitive AgX applications has been described in published PCT patent application WO 96/35142). These dyes have been also been disclosed for use as IR absorbing elements in laser addressable imaging elements in published European Patent Application EP 0764877A 1.

TABLE 12

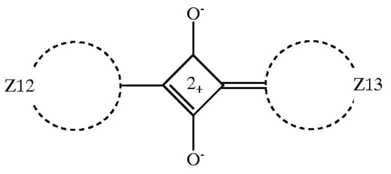

W

Squaraine dyes are well known to have good thermal stability, another preferred feature for any material of this invention. Z123 and Z13 independently represent any substituted aromatic or heteroaromatic nucleus. Typical aromatic nuclei include phenyl, naphthyl, pyrrylium, thiopyrrylium, or any other group which provides that the material is luminescent or absorbs a wavelength in the IR or UV region of the spectrum. Heteroaromatic rings could be but not limited to benzoxazolium, benthiazolium, quinoline or any other group which provided that the material is luminescent. It is also noteworthy to mention that the center ring does not have to feature the negative charge oxygen (O—). In fact squaraines where the central chain atom is either carbon or nitrogen have been disclosed in U.S. Pat. No. 5,227,499 and U.S. Pat. No. 5,227,498.

Another class of IR materials are illustrated in Table 13. These squaraine and croconium dyes are disclosed in *Sensors and Actuators B*, 38–39, 202–206 (1997) and *Sensors and Actuators B*, 38–39, 252–255 (1997). The croconium dyes like squaraines are well known to have good thermal stability, another preferred feature for any material of this invention. Z12 and Z13 independently represent any substituted aromatic or heteroaromatic nucleus. Typical aromatic nuclei include phenyl, naphthyl, any other group which provided that the material is luminescent. pyrrylium, thiopyrrylium. Heteoaromatic includes but not limited to benzoxazolium, benthiazolium, quinoline or any other group which provided that the material is luminescent.

TABLE 13

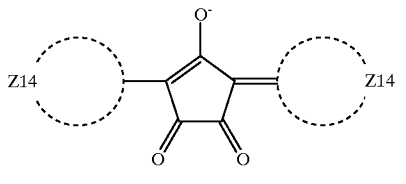

X wherein Z14 represents any substituted aromatic or heteroaromatic nucleus.

Materials that are not intrinsically luminescent, but become so after an activation step, can be used in the practice of this invention. The art is plentiful of examples of materials which fit this description. Table 14 represents one of the more common materials. Other materials exist and respective methods for generating them are known. Generally these materials are considered useful for this invention if a luminescent material is the result of an activation step. Some of the most common activating steps include the use of light (the materials are referred to as “photochromic”), a chemical (usually some oxidant to oxidize a “leuco” dye), heat (e.g. thermographic),a reaction with another agent (e.g. a coupler with a photographic developer) or by non-covalent interaction between two or more agents often referred to as “host-guest or molecular recognition (e.g. metal complexation, chromophore-chromophore interactions, coupler-developer reaction. etc.).

TABLE 14

Equation 1

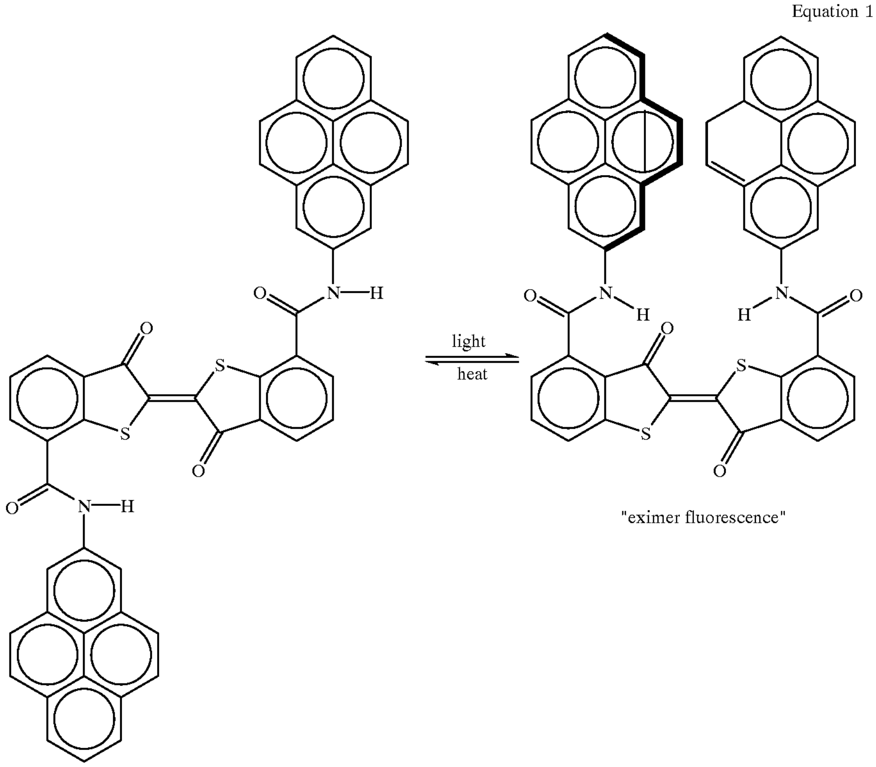

Equation 1 depicts the photo-conversion of a material into a material with additional “eximer fluorescence” (*J. Chem-.Soc.Chem. Commun.*, 591 (1992)). The process uses light to generate a new material which could be easily a luminescent material. In the above example a second point relevant to this patent is illustrated, that is, that a second stimulus (heat in the above example) may be used to reverse a material from a colored (or luminescent) state to a colorless (or non-luminescent) state. It is in the spirit of the invention that the encodement may not necessarily be due to the luminescent material directly but may be due to its removal from a luminescent background.

Equation 2

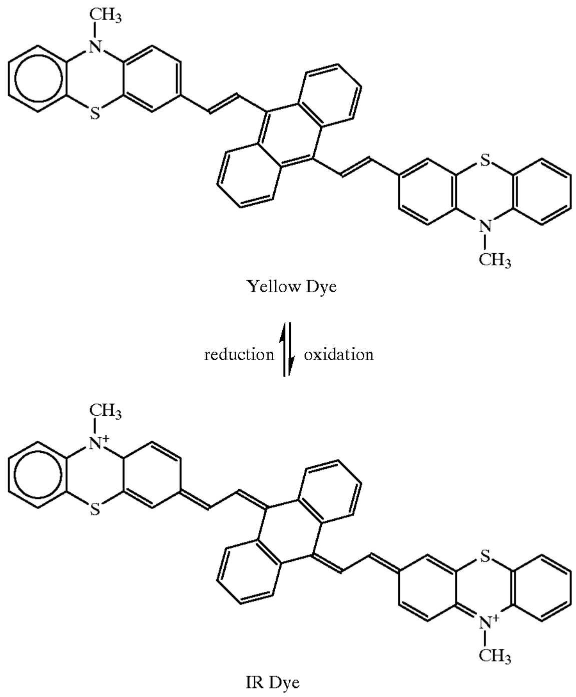

Equation 2 shows another type of activation of a material (*Angew. Chem. Int. Ed. Engl.*, (24),2817–2819, (1997)). A material (or its luminescence) may be "turned on" or "off" with redox chemistry. The oxidation may come about by simple post-coating reaction with a molecular oxidant or a more complicated photographic process (generation of an oxidized color developer). Equation 2 also illustrates the possibility of a reversible system.

Equation 3 illustrates yet another possible way of generating a luminescent compound. This process involves the selective complexation ("molecular recognition" or "host-guest") of one non-luminescent component (dye-ligand) by another ($Cu^{2+}$ ion) to in this case convert the material to a luminescent material (*Angew. Chem. Int. Ed.* 37,772–773, (1998)). This example shows the formation of a new material without the possibility for reversal. However it is well known that molecular recognition can be used to form a transient luminescent species that can be reverted back to the non-luminescent material (*J. Mater. Chem.*, 8 (6), 1379–1384, (1998)). A luminescent material could be converted to a non-luminescent material for the encodement. The mechanisms by which these materials luminesce or do not luminesce and their physical attributes have been thoroughly reviewed (*Chem. Rev.*, 97, 1515–1564, (1997)). The materials and methods for generating luminescence described within this reference are useful in the practice of this invention.

Equation 3

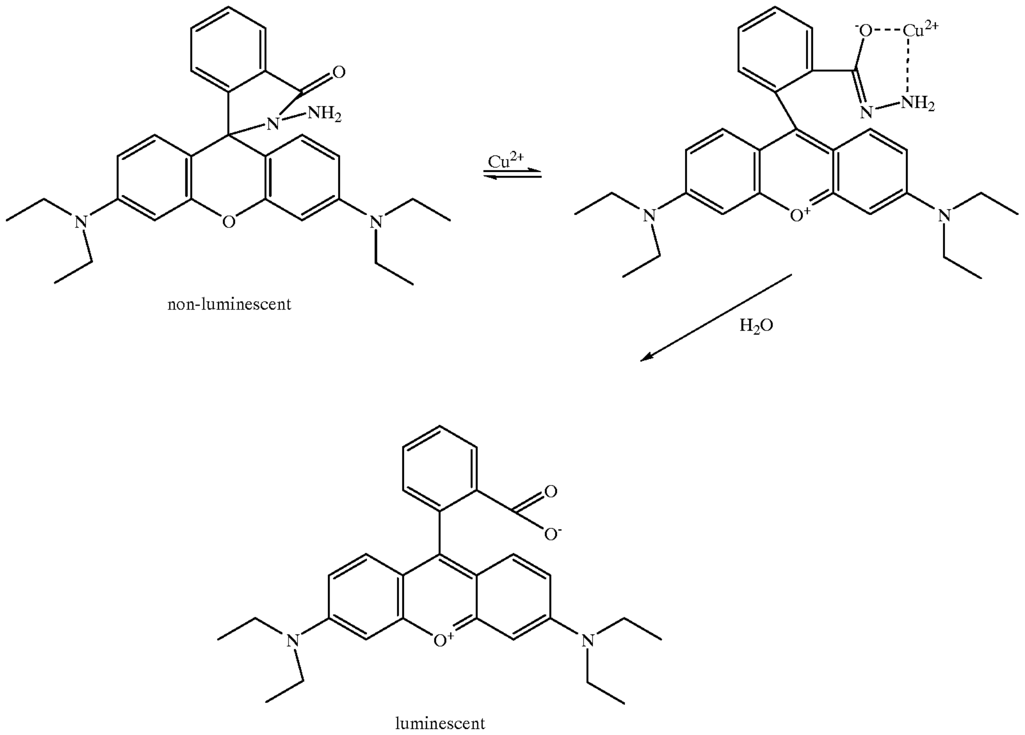

Specific materials that can be used in this invention include:

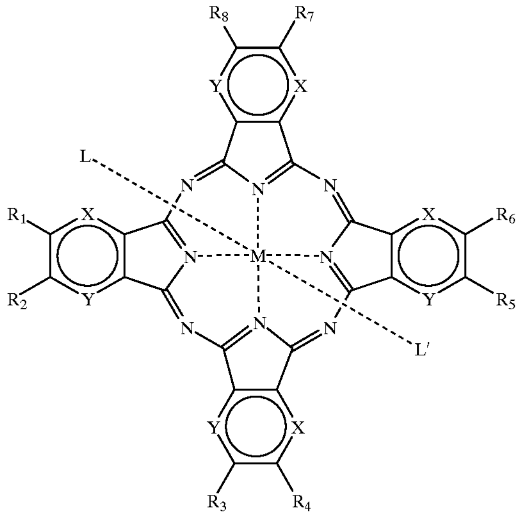

| Compound | R1 | R2 | R3 | R4 | R5 | R6 | R7 | R8 | X | Y | M | L | L' |
|---|---|---|---|---|---|---|---|---|---|---|---|---|---|
| I-1 | H | H | H | H | H | H | H | H | CH | CH | Al | Cl | — |
| I-2 | H | H | H | H | H | H | H | H | CH | CH | Al | OR[a] | — |
| I-3 | H | H | H | H | H | H | H | H | CH | CH | H2 | — | — |
| I-4 | H | H | H | H | H | H | H | H | CH | CH | Si | Cl | Cl |
| I-5 | H | H | H | H | H | H | H | H | CH | CH | Si | OH | OH |
| I-6 | H | H | H | H | H | H | H | H | CH | CH | Si | OR[a] | OR[a] |
| I-7 | H | H | H | H | H | H | H | H | CH | CH | Mg | — | — |
| I-8 | H | H | H | H | H | H | H | H | CH | CH | Zn | — | — |
| I-9 | H | H | H | H | H | H | H | H | CH | CH | Mn | — | — |
| I-10 | H | H | H | H | H | H | H | H | CH | CH | Eu | — | — |
| I-11 | H | H | H | H | H | H | H | H | CH | CH | Yb | — | — |
| I-12 | H | H | H | H | H | H | H | H | CH | CH | Sn | — | — |
| I-13 | H | H | H | H | H | H | H | H | NH | CH | Al | Cl | — |
| I-14 | H | H | H | H | H | H | H | H | NH | CH | Al | OR[a] | — |
| I-15 | H | H | H | H | H | H | H | H | NH | CH | H2 | — | — |
| I-16 | H | H | H | H | H | H | H | H | NH | CH | Si | Cl | Cl |
| I-17 | H | H | H | H | H | H | H | H | NH | CH | Si | OH | OH |
| I-18 | H | H | H | H | H | H | H | H | NH | CH | Si | OR[a] | OR[a] |
| I-19 | H | H | H | H | H | H | H | H | NH | CH | Mg | — | — |
| I-20 | H | H | H | H | H | H | H | H | NH | CH | Zn | — | — |
| I-21 | H | H | H | H | H | H | H | H | NH | CH | Mn | — | — |
| I-22 | H | H | H | H | H | H | H | H | NH | CH | Sn | — | — |
| I-23 | H | H | H | H | H | H | H | H | NH | CH | Eu | — | — |
| I-24 | H | H | H | H | H | H | H | H | CH | CH | Yb | — | — |
| I-25 | $SO_3^-$ | H | $SO_3^-$ | H | $SO_3^-$ | H | $SO_3^-$ | H | CH | CH | Al | Cl | — |
| I-26 | $SO_3^-$ | H | $SO_3^-$ | H | $SO_3^-$ | H | $SO_3^-$ | H | CH | CH | Al | OR[a] | — |
| I-27 | $SO_3^-$ | H | $SO_3^-$ | H | $SO_3^-$ | H | $SO_3^-$ | H | CH | CH | H2 | — | — |
| I-28 | $SO_3^-$ | H | $SO_3^-$ | H | $SO_3^-$ | H | $SO_3^-$ | H | CH | CH | Si | Cl | Cl |
| I-29 | $SO_3^-$ | H | $SO_3^-$ | H | $SO_3^-$ | H | $SO_3^-$ | H | CH | CH | Si | OH | OH |
| I-30 | $SO_3^-$ | H | $SO_3^-$ | H | $SO_3^-$ | H | $SO_3^-$ | H | CH | CH | Si | OR[a] | OR[a] |
| I-31 | $SO_3^-$ | H | $SO_3^-$ | H | $SO_3^-$ | H | $SO_3^-$ | H | CH | CH | Mg | — | — |
| I-32 | $SO_3^-$ | H | $SO_3^-$ | H | $SO_3^-$ | H | $SO_3^-$ | H | CH | CH | Zn | — | — |
| I-33 | $SO_3^-$ | H | $SO_3^-$ | H | $SO_3^-$ | H | $SO_3^-$ | H | CH | CH | Mn | — | — |
| I-34 | $SO_3^-$ | H | $SO_3^-$ | H | $SO_3^-$ | H | $SO_3^-$ | H | CH | CH | Eu | — | — |
| I-35 | $SO_3^-$ | H | $SO_3^-$ | H | $SO_3^-$ | H | $SO_3^-$ | H | CH | CH | Sn | — | — |
| I-36 | $SO_3^-$ | H | $SO_3^-$ | H | $SO_3^-$ | H | $SO_3^-$ | H | CH | CH | Yb | — | — |
| I-37 | t-butyl | H | t-butyl | H | t-butyl | H | t-butyl | H | CH | CH | Al | Cl | — |
| I-38 | t-butyl | H | t-butyl | H | t-butyl | H | t-butyl | H | CH | CH | H2 | — | — |
| I-39 | t-butyl | H | t-butyl | H | t-butyl | H | t-butyl | H | CH | CH | Al | OR[a] | — |
| I-40 | t-butyl | H | t-butyl | H | t-butyl | H | t-butyl | H | CH | CH | Si | Cl | Cl |
| I-41 | t-butyl | H | t-butyl | H | t-butyl | H | t-butyl | H | CH | CH | Si | OH | OH |
| I-42 | t-butyl | H | t-butyl | H | t-butyl | H | t-butyl | H | CH | CH | Si | OR[a] | OR[a] |
| I-43 | t-butyl | H | t-butyl | H | t-butyl | H | t-butyl | H | CH | CH | Mg | — | — |
| I-44 | t-butyl | H | t-butyl | H | t-butyl | H | t-butyl | H | CH | CH | Zn | — | — |
| I-45 | t-butyl | H | t-butyl | H | t-butyl | H | t-butyl | H | CH | CH | Mn | — | — |
| I-46 | t-butyl | H | t-butyl | H | t-butyl | H | t-butyl | H | CH | CH | Yb | — | — |
| I-47 | t-butyl | H | t-butyl | H | t-butyl | H | t-butyl | H | CH | CH | Sn | — | — |
| I-48 | t-butyl | H | t-butyl | H | t-butyl | H | t-butyl | H | CH | CH | Eu | — | — |
| I-49 | t-butyl | H | t-butyl | H | t-butyl | H | t-butyl | H | N(Me)2 | CH | Al | Cl | Cl |
| I-50 | t-butyl | H | t-butyl | H | t-butyl | H | t-butyl | H | N(Me)2 | CH | Al | OH | OH |
| I-51 | t-butyl | H | t-butyl | H | t-butyl | H | t-butyl | H | N(Me)2 | CH | Al | OR[a] | OR[a] |

-continued

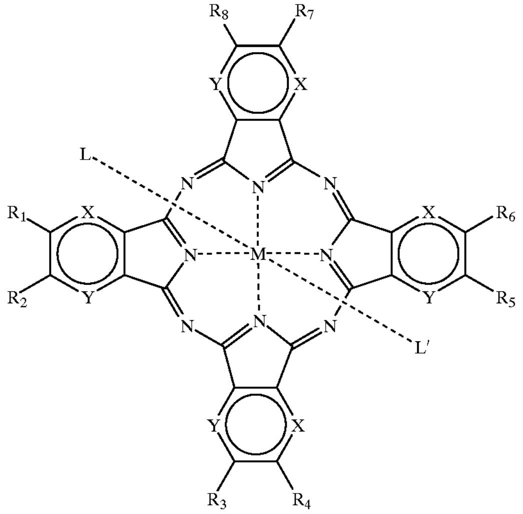

| Compound | R1 | R2 | R3 | R4 | R5 | R6 | R7 | R8 | X | Y | M | L | L' |
|---|---|---|---|---|---|---|---|---|---|---|---|---|---|
| I-52 | t-butyl | H | t-butyl | H | t-butyl | H | t-butyl | H | N(Me)2 | CH | Si | Cl | Cl |
| I-53 | t-butyl | H | t-butyl | H | t-butyl | H | t-butyl | H | N(Me)2 | CH | Si | OH | OH |
| I-54 | t-butyl | H | t-butyl | H | t-butyl | H | t-butyl | H | N(Me)2 | CH | Si | OR[a] | OR[a] |
| I-55 | t-butyl | H | t-butyl | H | t-butyl | H | t-butyl | H | N(Me)2 | CH | Mg | — | — |
| I-56 | t-butyl | H | t-butyl | H | t-butyl | H | t-butyl | H | N(Me)2 | CH | Zn | — | — |
| I-57 | t-butyl | H | t-butyl | H | t-butyl | H | t-butyl | H | N(Me)2 | CH | Mn | — | — |
| I-58 | t-butyl | H | t-butyl | H | t-butyl | H | t-butyl | H | N(Me)2 | CH | Eu | — | — |
| I-59 | t-butyl | H | t-butyl | H | t-butyl | H | t-butyl | H | N(Me)2 | CH | Sn | — | — |
| I-60 | t-butyl | H | t-butyl | H | t-butyl | H | t-butyl | H | N(Me)2 | CH | Yb | — | — |

[a]R could be any substituted alkyl (methyl, ethyl, n-butyl, t-butyl, isoamyl etc . . . ), any substituted silyl group (e.g. trimethylsilane, tributylsilane, trichlorosilane, triethoxysilane, etc . . . ) or any group that could be used to make the above compounds oligomeric or prevent dye aggregation)

I-61

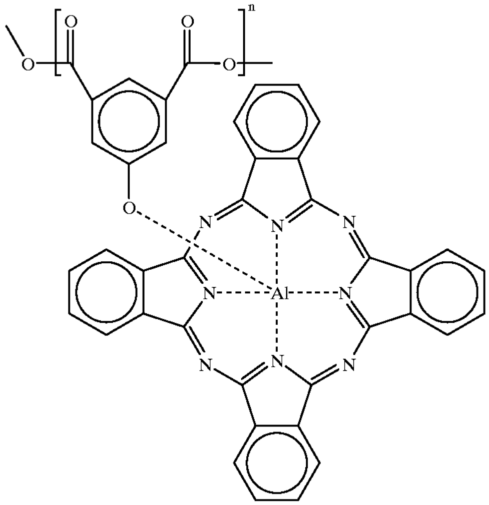

I-62

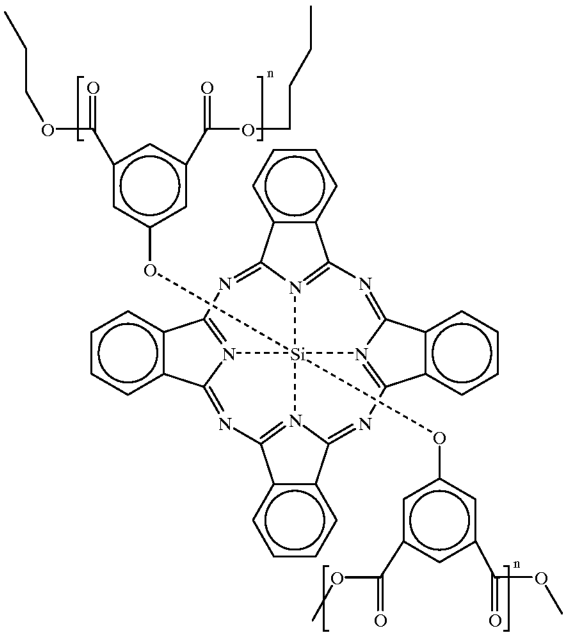

wherein n=any interger and the linkage depicts formation of any polyester.

wherein n=any interger and the linkage depicts formation of any polyester.

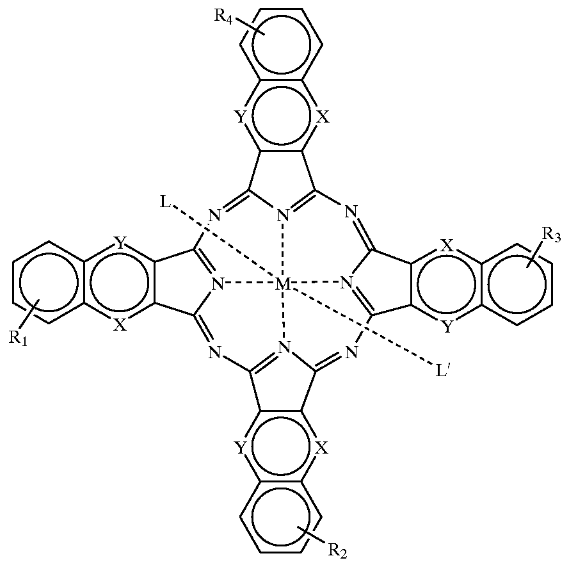

| Compound | R1 | R2 | R3 | R4 | X | Y | M | L | L' |
|---|---|---|---|---|---|---|---|---|---|
| II-1 | H | H | H | H | COR | COR | Al | Cl | — |
| II-2 | H | H | H | H | COR | COR | H2 | — | — |
| II-3 | H | H | H | H | COR | COR | Al | OR | OR |
| II-4 | H | H | H | H | COR | COR | Si | Cl | Cl |
| II-5 | H | H | H | H | COR | COR | Si | OH | OH |
| II-6 | H | H | H | H | COR | COR | Si | OR | OR |
| II-7 | H | H | H | H | COR | COR | Mg | Mg | — |
| II-8 | H | H | H | H | COR | COR | Zn | — | — |
| II-9 | H | H | H | H | COR | COR | Mn | — | — |
| II-10 | H | H | H | H | COR | COR | Eu | — | — |

-continued

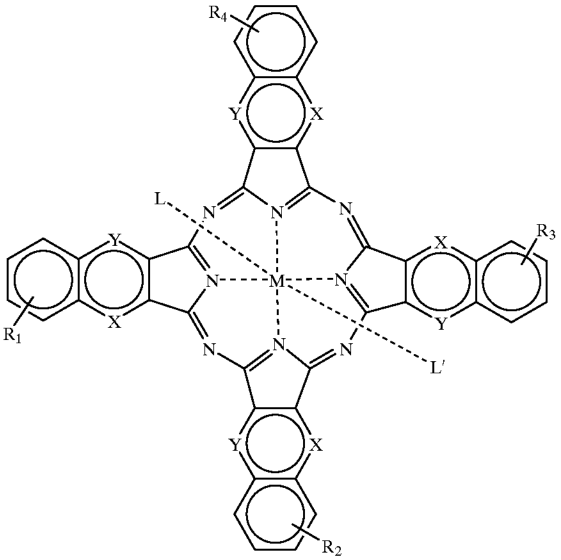

| Compound | R1 | R2 | R3 | R4 | X | Y | M | L | L' |
|---|---|---|---|---|---|---|---|---|---|
| II-11 | H | H | H | H | COR | COR | Sn | — | — |
| II-12 | H | H | H | H | COR | COR | Yb | — | — |

$R_1$, $R_2$, $R_3$, and $R_4$ are H. X and Y are CH or COR in any combination. R can be substituted silyl group (e.g. trimethylsilane, tributylsilane, trichlorosilane triethoxysilane, etc.) or any group that could be used to make the above compounds oligomeric or prevent dye aggregation.

III-1

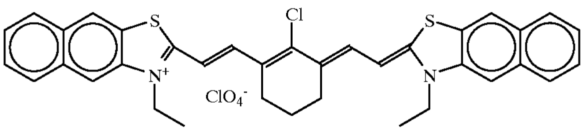

III-2

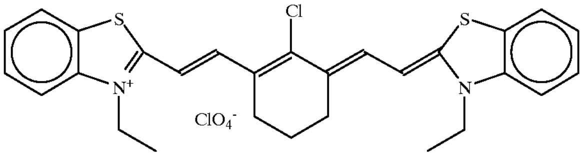

III-3

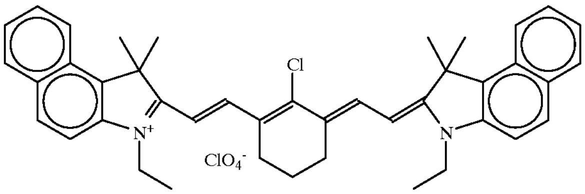

III-4

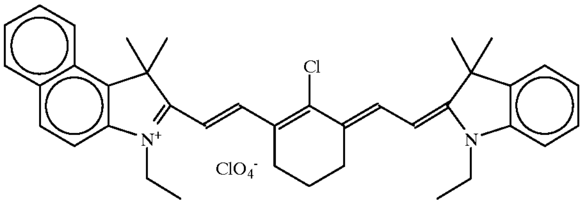

III-5

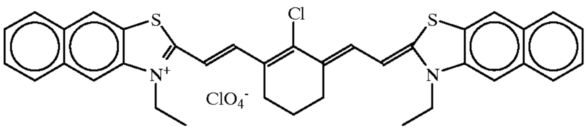

III-6

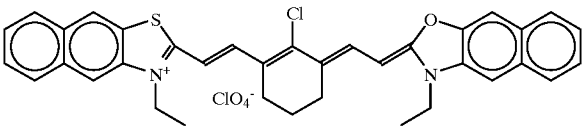

-continued
III-7
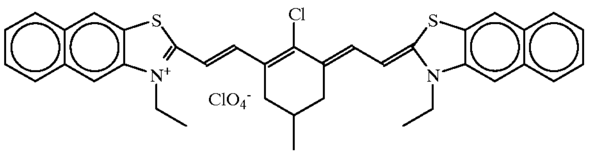
III-8
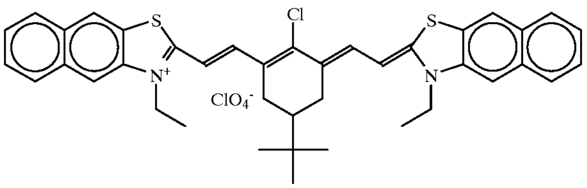
III-9
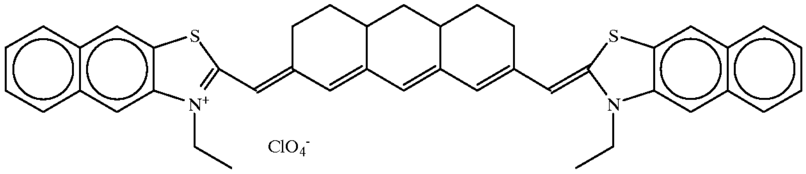
III-10
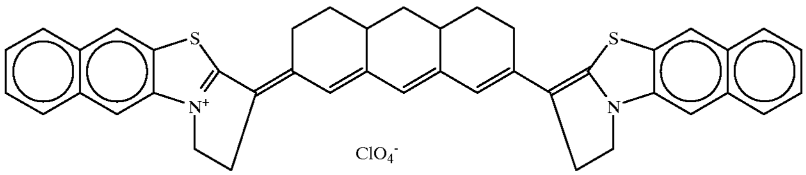
III-11
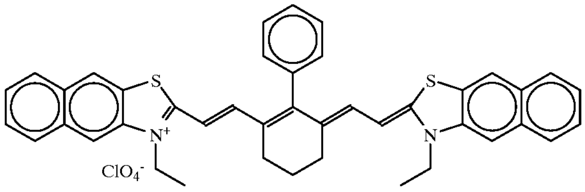
III-12
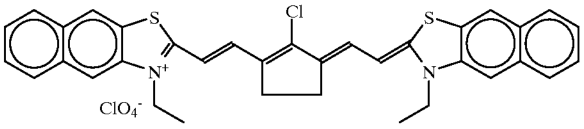
III-13
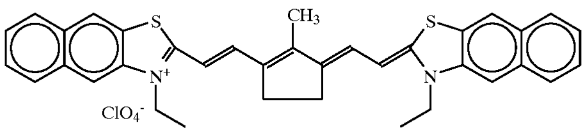
III-14
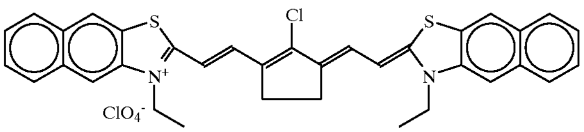
III-15
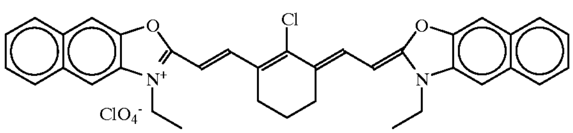
III-16
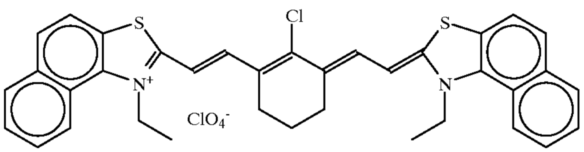
III-17
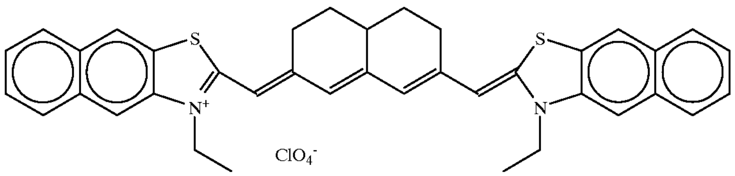
III-18
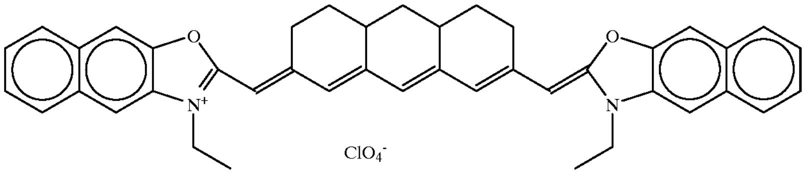

-continued
III-19
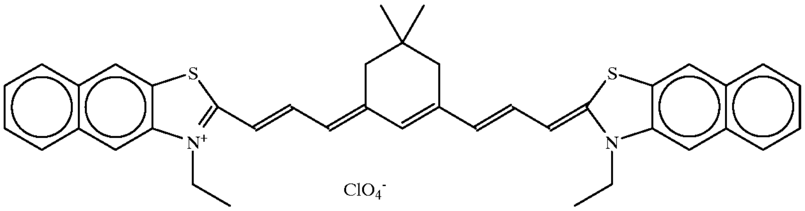
III-20
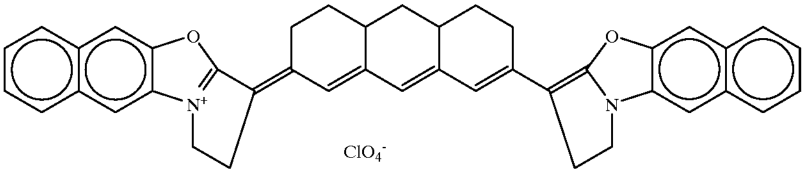
III-21
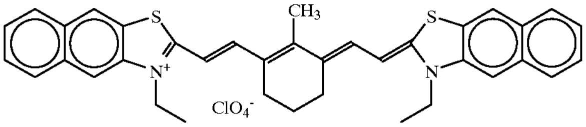
III-22
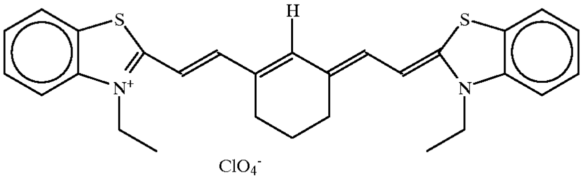
III-23
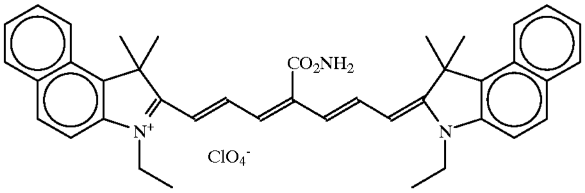
III-24
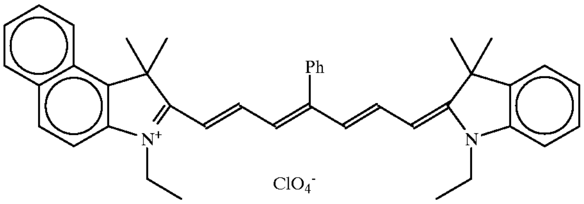
III-25
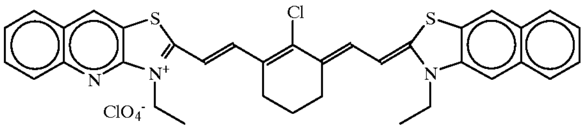
III-26
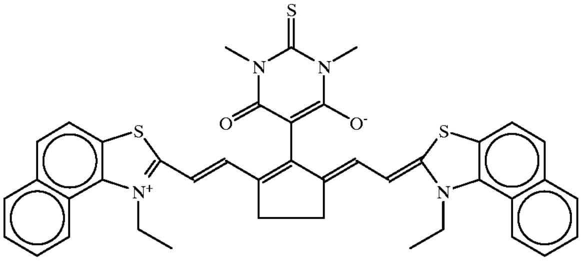
III-27
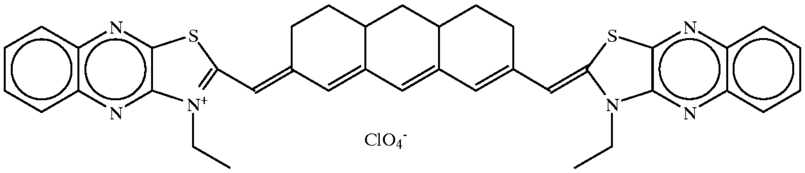
III-28
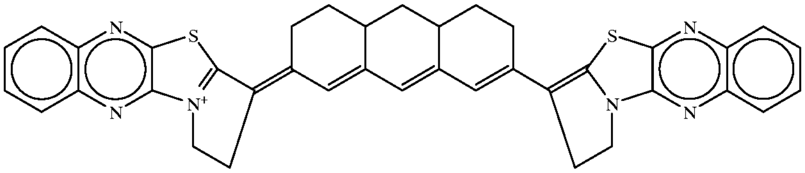

-continued
III-29
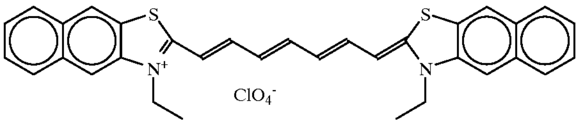
III-30
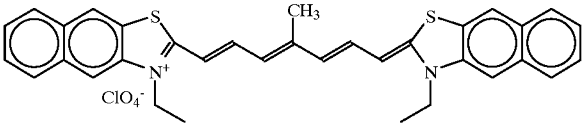
III-31
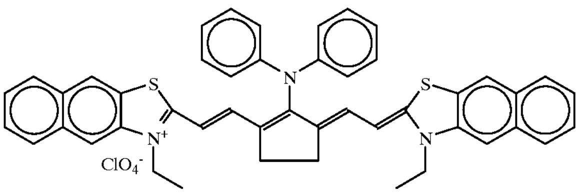
III-32
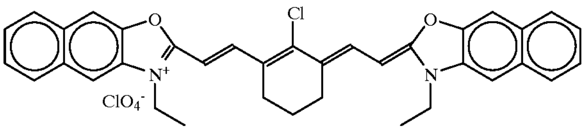
III-33
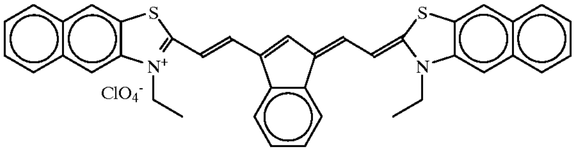
III-34
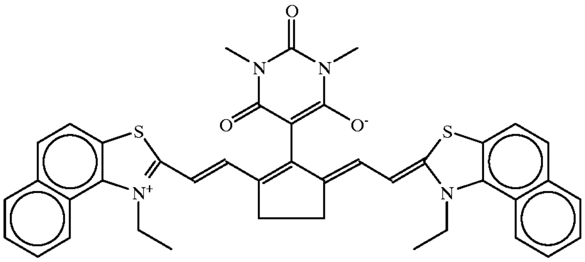
III-35
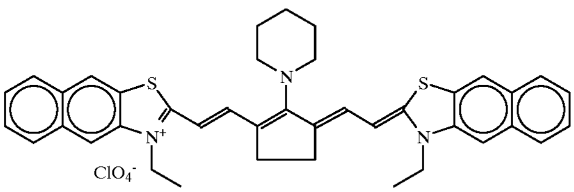
III-36
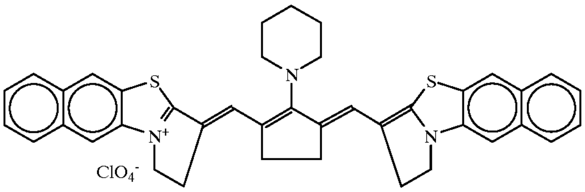
IV-1
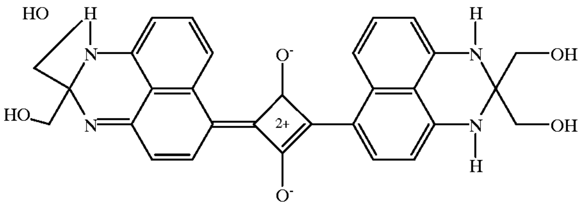
IV-2
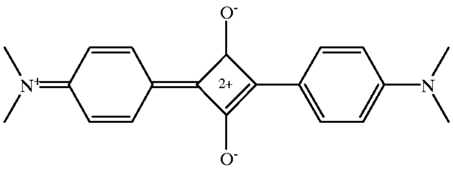
IV-3
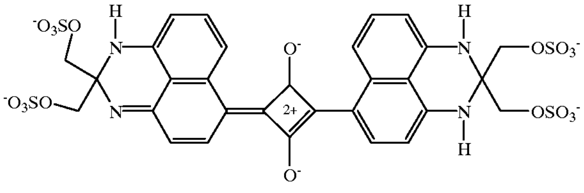
IV-4
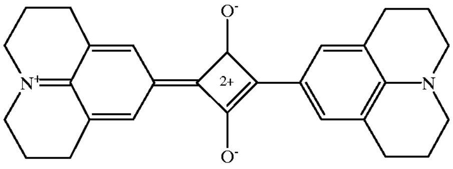

-continued
IV-5
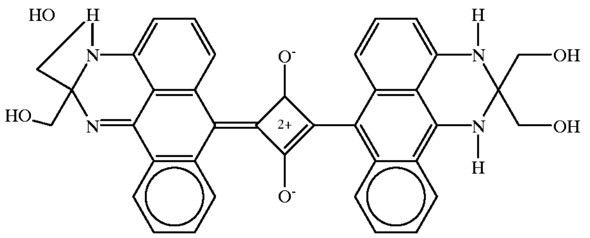
IV-6
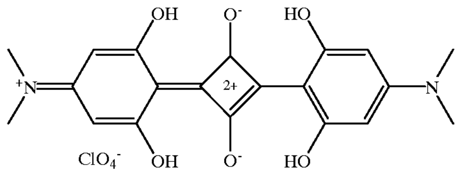
IV-7
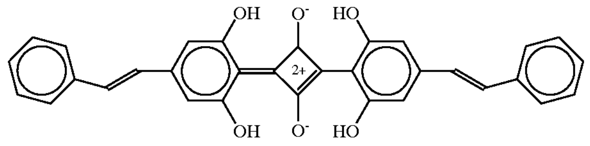
IV-8
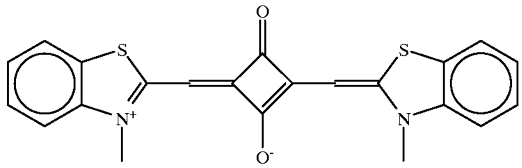
IV-9
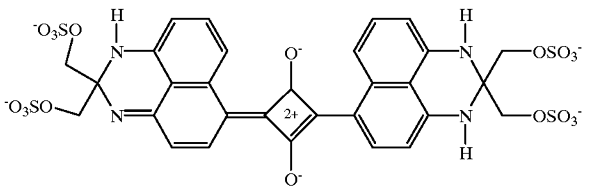
IV-10
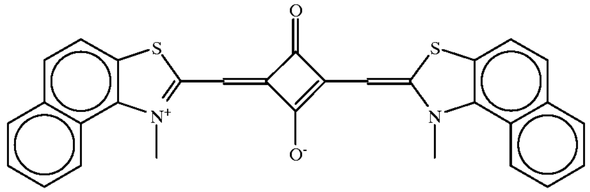
IV-11
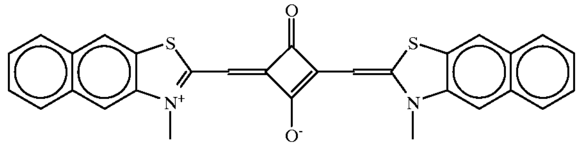
IV-12
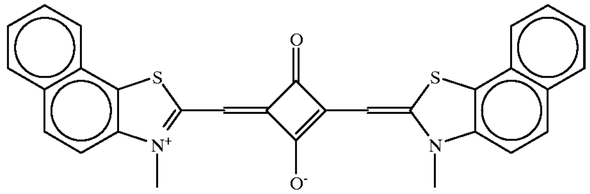
IV-13
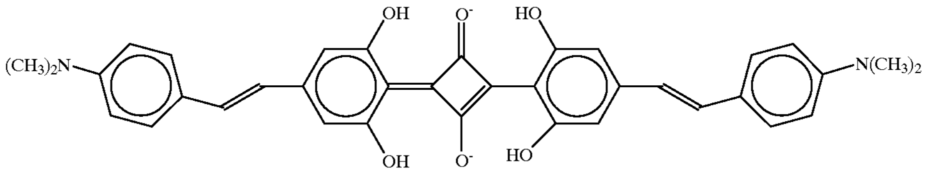
V-1
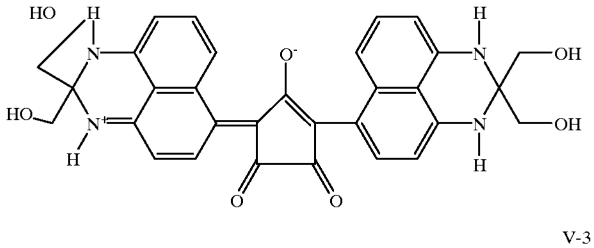
V-2
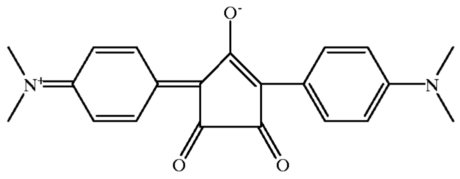
V-3
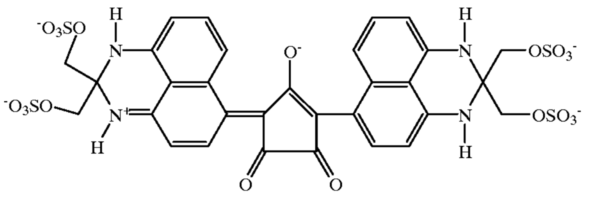
V-4
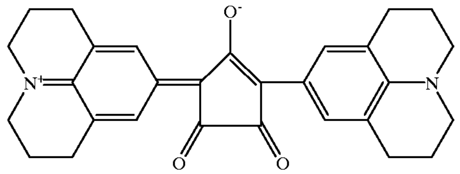

-continued
V-5
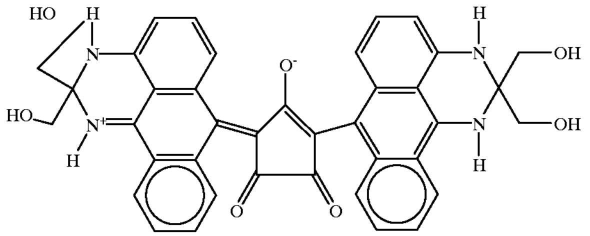
V-6
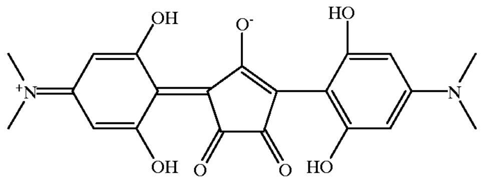
IV-7
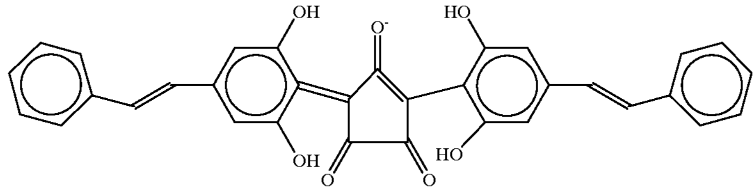
IV-8
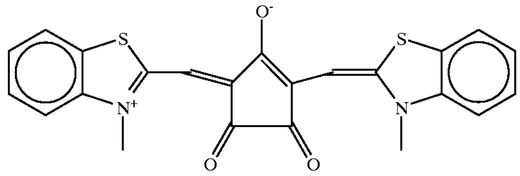
VI-1
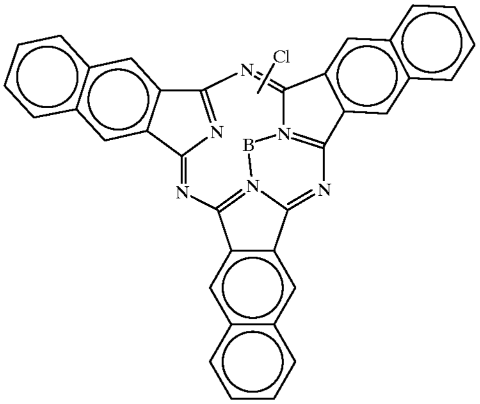
VI-2
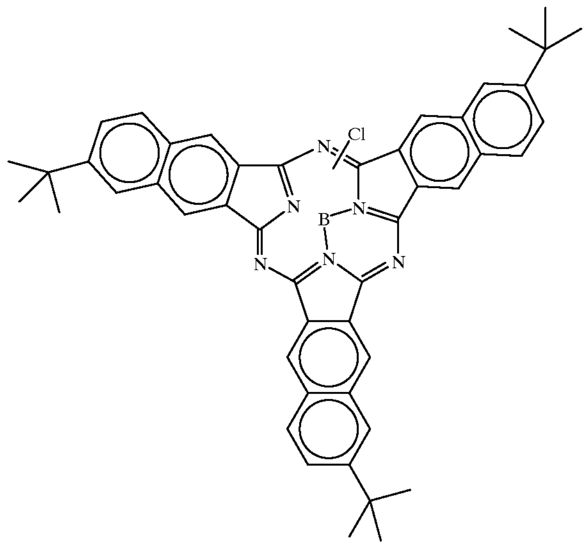
VI-3
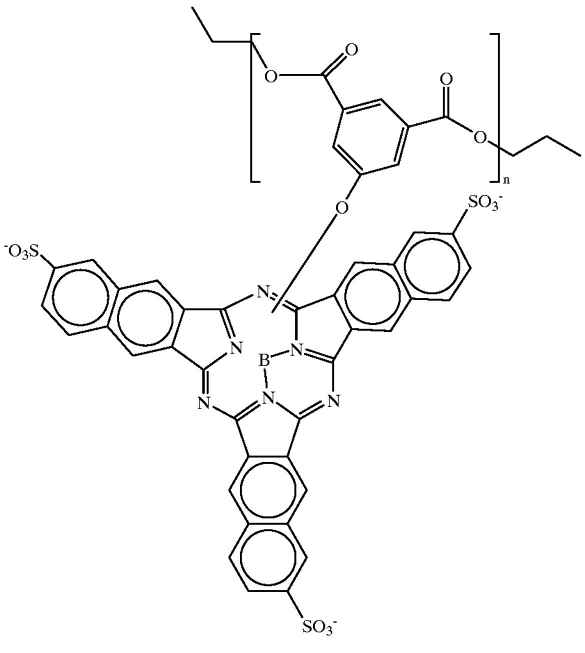

-continued
VI-4
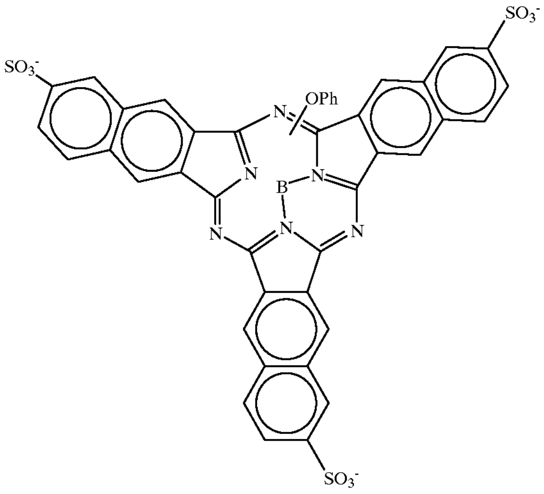
VII-1
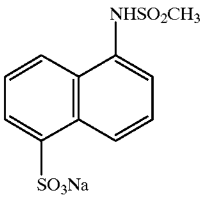
VIII-1
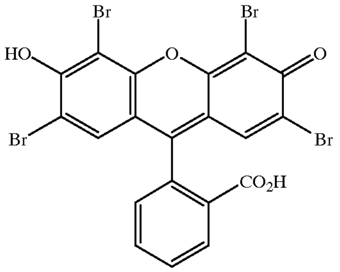
VIV-1
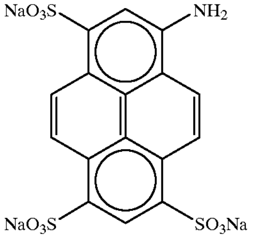
X-1
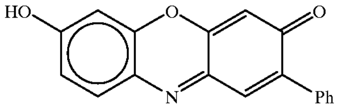
XI-1
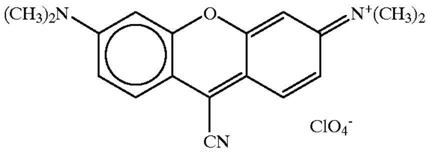
XI-3
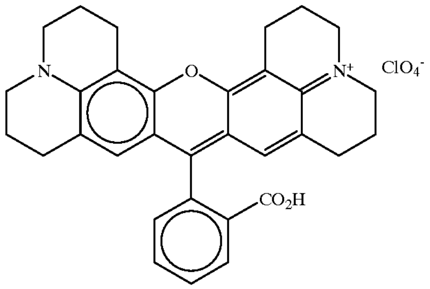
XI-2
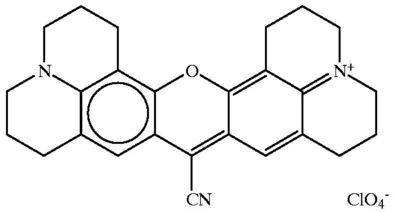
XII-1
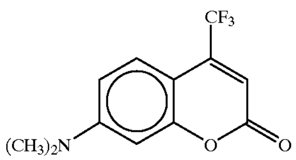
XIII-1
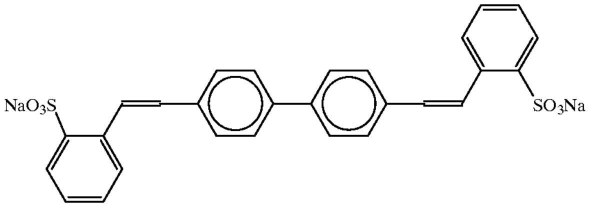

-continued
XIV-1
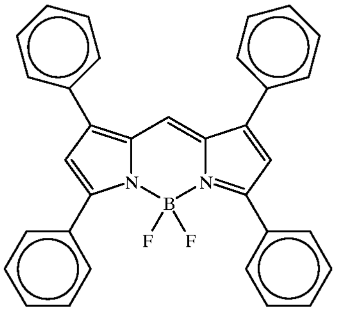
XIV-2
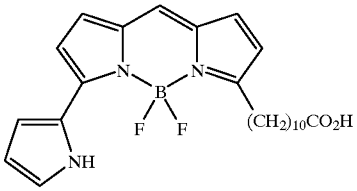
XIV-3
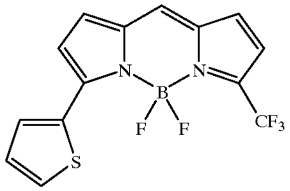
XIV-4
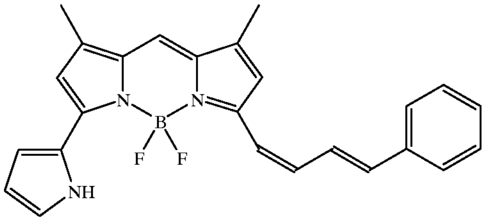
XV-1
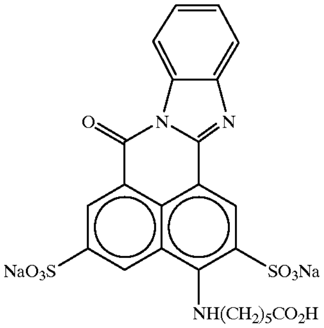
XVI-1
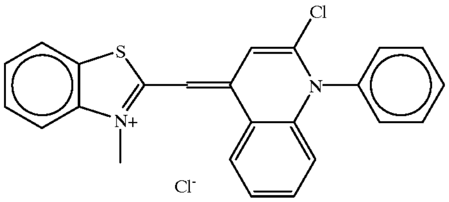
XVII-1
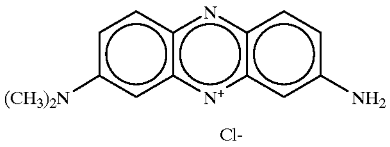
XVIII-1
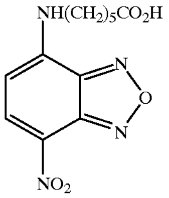
XIX-1
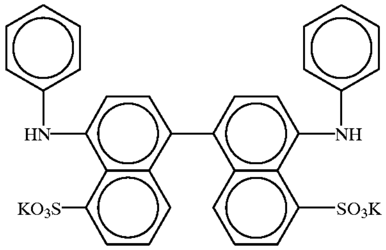
XX
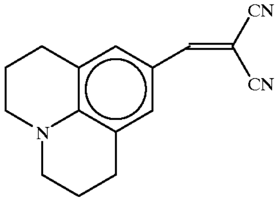

-continued
XXI
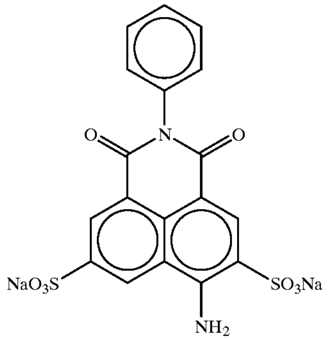
XXII
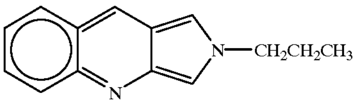
The following are some specific examples of useful dyes.
Dye 1 polymeric aluminum phthalocyanine dye (commercially available from Eastman Chemical as NIRF ink solution).
Dye 2
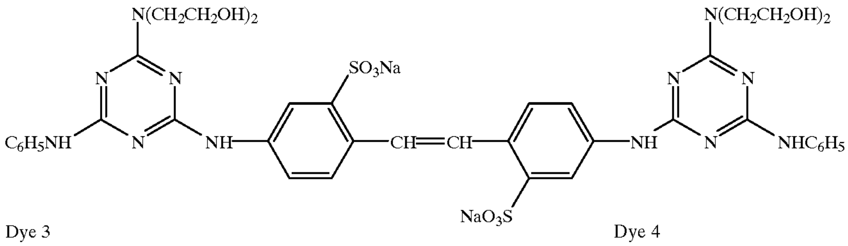
Dye 3
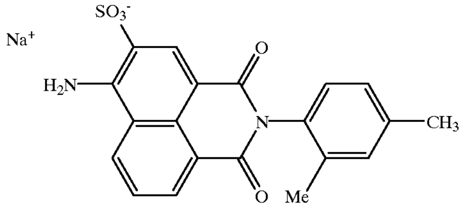
Dye 4
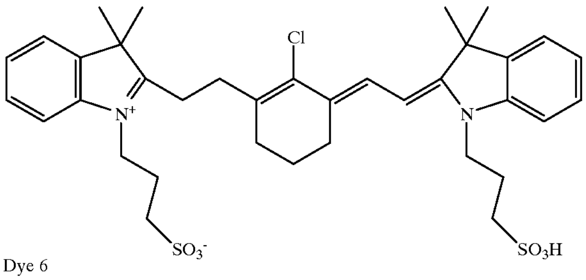
Dye 5
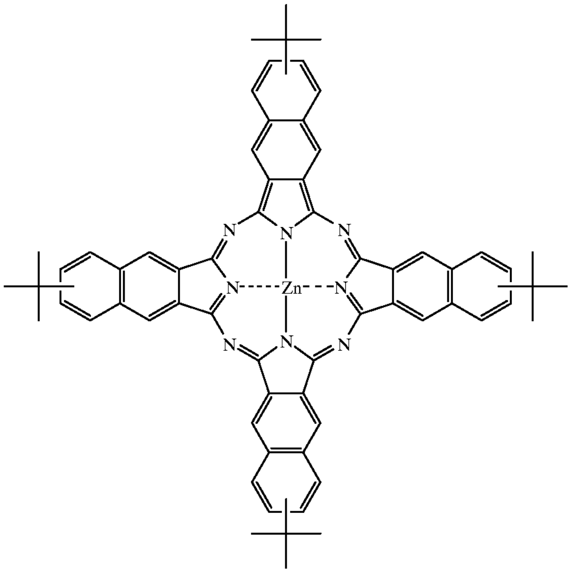
Dye 6
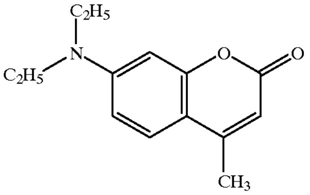

-continued

Dye 7

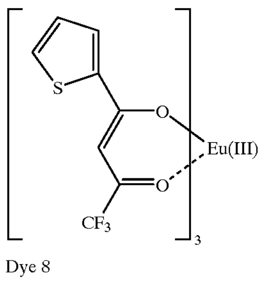

Dye 8

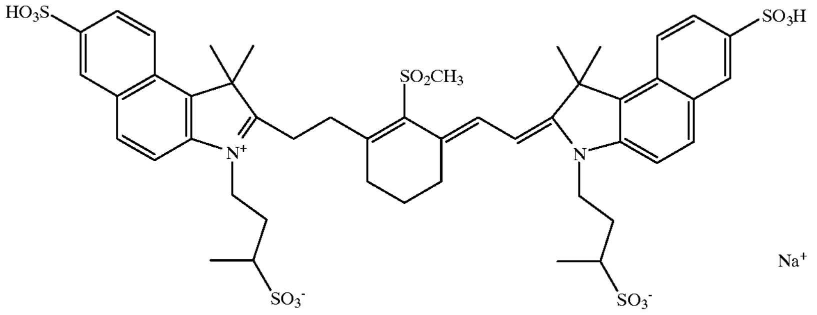

The methods of applying the invisible material on the holder 14 can be any digital imaging mechanism, including inkjet, direct thermal or thermal transfer printing, electrophotography, molecular recognition, thermal, and light induced chemical reaction, such as oxidant, reductant or metal complexation, of leuco dyes. Other methods include the use of commercial color imaging systems, such as Cycolor™ system available from Cycolor Inc., 8821 Washington Church Road, Miamisburgh, Ohio 45342 and microcapsules (cyliths) containing colored dyes are selectively imagewise exposured with sequential red, green and blue light. The light initiates the hardening of the shell of the exposed bead rendering them resistant to destruction during the processing step. During the processing step the beads are compressed and the non-hardened beads are crushed releasing their colored dye which is the complimentary to the exposure color (red/cyan, green/magenta, blue/yellow). A discussion on methods of applying a material to a surface can be found in "Imaging Processes and Materials", chapter 1, Neblette's, $8^{th}$ ed., Van Nostrand Reinhold, 1989. The ink deposit 22 is generally discussed herein in terms of ink jet printing, but it will be understood that like considerations apply to other printing methods.

The following are specific examples of inkjet and thermal dye transfer methods for applying infrared luminescence ink deposits 22 on the holders 14.

Inkiet Method

The concentration of the invisible material in the ink solution can be 0.005%~1% by weight, preferably 0.01%~0.1% by weight. A suitable surfactant such as surfynol® 465 surfactant (an ethoxylated dialcohol surfactant sold by Air Products and Chemicals, Inc.)can be added at 0.5%–2% by weight, with the presence of 2–10% glycerol, 2–10% diethyleneglycol, 2–10% propanol, and 0%–2% triethanolamine. Commercial inkjet printers such as HP690C or Epson Stylus Color 200 was used for the testing, with the printing resolution of 300 or 360 dpi. Either step wedge files or 2-D bar-code encoding compressed sound file can be printed digitally onto various supports at the visual reflection density of 0.01–0.3, preferably 0.05–0.1.

Thermal Dye Transfer Method

An assemblage of thermal dye transfer such as described in U.S. Pat. No. 4,839,336 can be used. This assemblage comprises: (a) a dye-donor element that contains the invisible material, and (b) a dye-receiving element which is in a superposed relationship with the dye-donor element so that the dye-layer of the donor element is in contact with the dye-image receiving layer of the receiving element. The dye-receiving element is the ink receptive layer of the holder. The assemblage may be pre-assembled as an integral unit when a single luminescent dye material is transferred. This can be done by temporarily adhering the two elements together at their margins. After transfer, the dye-receiving element is then peeled apart to expose the dye transfer image. More than one dye donor sheet containing different luminescent materials can also be used and multiple luminescent 2D bar-code images can be transferred consecutively.

The luminescent material in the dye-donor element is dispersed in a polymer binder such as a cellulose derivatives, e.g., cellulose acetate hydrogen phthalate, cellulose acetate propionate, cellulose acetate butyrate, cellulose triacetate or any of the materials described in U.S. Pat. No. 4,700,207. The binder may be used at a coverage of from about 0.1 to about 5 $g/m^2$, and the luminescent material can be used at a coverage of from about 0.02 to about 0.2 $g/m^2$. The support for dye-donor element in this invention can be any material that is dimensionally stable and can withstand the heat of the thermal printing heads. Such materials include polyesters such as poly(ethylene terephthalate); polyamides; polycarbonates; cellulose esters such as cellulose acetate; fluorine polymers such as polyvinylidene fluoride or poly (tetrafluoroethylene-co-hexafluoropropylene); polyethers such as polyoxymethylene,; polyacetals; polyolefins such as polystyrene, polyethylene, polypropylene or methylpentane polymers; and polymides such as polymide-amides and polyetherimides. The support may be coated with a subbing layer, if desired, such as those materials described in U.S. Pat. No. 4,695,288.

The following are examples of specific ink formulations.

Formulation 1

1.5 g of stock solution of ink containing a near-IR dye (dye 1, 0.06% by weight,) commercially available from Eastman Chemical Company as a NIRF™ ink (PM19599) diluted with 13.5 g of solution containing surfynol® 465 (from Air Product), glycerol, diethyleneglycol, propanol and distilled water so that the final concentration of dye 1 is 0.006% by weight and 1% surfynol 465, 5% glycerol, 4% diethyleneglycol and 5% propanol. The resulting ink solution can be filled into a refillable inkjet cartridge. Ink deposits are invisible to human eye under normal viewing conditions.

Formulation 2

The ink solution of Formulation 1 can be modified by substituting for the fluorescent dye is a UV-absorbing, visible fluorescing dye (dye 2) at a final concentration of dye 2 is 0.1% by weight in the ink solution.

Formulation 3

The ink solution of Formulation 1 can be modified by substituting for the fluorescent dye is a visible-absorbing, visible fluorescing dye (dye 3), and that the final concentration of dye 3 is 0.01% by weight in the ink solution.

Formulation 4

The ink solution of Formulation 1 can be modified by substituting for the fluorescent dye is an infrared-absorbing, infrared fluorescing dye (dye 4, a cyanine dye), and that the final concentration of dye 4 is 0.01% by weight in the ink solution.

Formulation 5

A luminescence dye-donor element can be prepared by coating the following layers in the order recited on a holder:

(1) Subbing layer of duPont Tyzor TBT® titanium tetra-n-butoxide (0.16 $g/m^2$) coated from a n-butyl alcohol and n-propylacetate solvent mixture, and (2) Dye layer containing the luminescent dye (dye 5, a zinc naphthalocyanine derivative) shown in Table 1 (0.054 $g/m^2$), in a cellulose acetate propionate (2.5% acetyl, 48% propionyl) binder (0.14 $g/m^2$) coated from a 2-butanone and propyl acetate (80/20 ratio by weight) solvent mixture.

(3) A slip layer was coated on the back side of the element similar to that disclosed in U.S. Pat. (Henzel et a;, Jun. 16, 1987)

The dye receiving element can be similar to that disclosed in U.S. Pat. No. 4,839,336.

Formulation 6

The element of Formulation 5 can be modified by use as the luminescent dye a UV absorbing, visible fluorescing dye (dye 6, a coumarin dye).

Formulation 7

The element of Formulation 5 can be modified by use as the luminescent dye a UV absorbing, visible fluorescing dye (dye 7, an europium complex).

Formulation 8

The element of Formulation 5 can be modified by use as the luminescent dye an infrared-absorbing, nonfluorescing dye (dye 8) at a final concentration of dye 8 is of 200 ppm by weight in the ink solution.

The dye-donor element may used in sheet form or in a continuous roll or ribbon. The reverse side of the dye-donor element may be coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. Preferred lubricating materials include oils or semicrystalline organic solids that melt below 100° C. such as poly (vinyl stearate), beeswax, perfluorinated alkyl ester polyethers, poly(caprolactone), silicone oil, poly (tetrafluoroethylene), carbowax, poly(ethylene glycols). Suitable polymeric binders for the slipping layer include poly(vinyl alcohol-cobutyral), poly(vinyl alcohol-co-acetal), poly(styrene), poly(vinyl acetate), cellulose acetate butyrate, cellulose acetate propionate, cellulose acetate or ethyl cellulose. The amount of the lubricating is generally in the range of about 0.001 to about 2 $g/m^2$. In the presence of a polymeric binder, the lubricating material is present in the range of 0.01 to 50 weight %, preferably 0.5 to 40, of the polymer binder employed.

The support of the holder can be transparent film such as a poly(ether sulfone), a polymide, a cellulose ester such as cellulose acetate, a poly(vinyl alcohol-co-acetal) or a poly (ethylene terephthalate). The ink receptive layer can comprise, for example a polycarbonate, a polyurethane, a polyester, polyvinyl chloride, poly(styrene-co-acrylonitrile), poly(carprolactone) or mixtures thereof. The ink receptive layer can be present in the amount of about 1 to about 5 $g/m^2$.

Thermal printing heads which can be used to transfer dye from the dye-donor elements are available commercially. There can be employed, for example, a Fujitsu Thermal Head (FTP-040 MCSOO1), a TDK thermal head F415 HH7-1089 or a Rohm Thermal Head KE 2008-F3.

The playback device is preferably a hand held wand reader or a digital camera engineered to operate in a dual role as a playback device. The sensor of this device can have integrated CCD or CMOS technology with a LED illumination source, decoding software and circuits. One example of such a device would also have the mechanism to playback the file as an analog sound file. Descriptions of such devices can be found in commonly assigned copending U.S. patent application Ser. Nos. 08/931,575; 09/099627; 08/959,041; 08/959,036; and 09/099,616, the entire disclosures of which are incorporated herein by reference.

The invention has been described in detail with particular reference to certain preferred embodiments thereof, but it will be understood that variations and modifications can be effected within the spirit and scope of the invention.

What is claimed is:

1. A printed sheet jacket comprising:

a holder having at least one pocket, said pocket defining a space for the printed sheet, said holder having a transparent ink receptive layer exterior to said space; and an ink deposit carried by said ink receptive layer, said ink deposit being transparent to visible light.

2. The jacket of claim 1 wherein said pocket has a transparent front wall supporting said ink receptive layer, said front wall being exterior to said space.

3. The jacket of claim 2 wherein said ink receptive layer is exterior to said front wall.

4. The jacket of claim 2 wherein said ink receptive layer is interior to said front wall.

5. The jacket of claim 4 wherein said front wall includes an ultraviolet light blocker.

6. The jacket of claim 1 wherein said ink deposit is invisible.

7. The jacket of claim 1 wherein said ink receptive layer fully overlaps said space.

8. The jacket of claim 1 wherein said ink deposit is non-transparent to infrared radiation.

9. The jacket of claim 1 wherein said holder has a plurality of pockets.

10. The jacket of claim 1 wherein said ink receptive layer has a drying time of less than 3 minutes.

11. The jacket of claim 1 wherein said ink receptive layer has a drying time of less than 2 minutes.

12. The jacket of claim 1 wherein said ink receptive layer has a drying time of less than 1 minute.

13. The jacket of claim 1 wherein said holder has a transparent front wall supporting said ink receptive layer, said front wall being exterior to said space, said front wall and said ink receptive layer having a combined haze value of less than 10 percent.

14. The jacket of claim 13 wherein said haze value is less than 7 percent.

15. The jacket of claim 13 wherein said haze value is less than 5 percent.

16. The jacket of claim 1 wherein said pockets each have a face sheet and an opposed rear sheet and said face sheet includes said ink receptive layer.

17. The jacket of claim 16 wherein said rear sheet includes a second said transparent ink receptive layer.

18. A jacket assembly comprising:

a holder having at least one pocket, said holder having a transparent ink receptive layer exterior to said pocket;

an ink deposit carried by said ink receptive layer, said ink deposit being transparent to visible light; and a printed sheet disposed in said pocket facing said transparent ink receptive layer.

19. An album comprising:

a binding; and a plurality of jackets retained by said binding, each said jacket including:

a holder having at least one pocket, said pocket defining a space, said holder having a transparent ink receptive layer exterior to said space; and an ink deposit carried by said ink receptive layer of said pocket, said ink deposit being transparent to visible light.

20. The album of claim 19 wherein said ink deposit is non-transparent to infrared radiation.

21. The album of claim 19 wherein said holders each have a plurality of pockets.

22. The album of claim 19 wherein said holder each have a plurality of pockets, said pockets each have a respective said ink receptive layer, and each said jacket includes respective ink deposits carried by said ink receptive layers.

23. The album of claim 22 wherein said said pockets each have a face sheet and an opposed rear sheet and said rear sheets each include a second said transparent ink receptive layer.

* * * * *